United States Patent
Ohta et al.

(10) Patent No.: US 7,362,385 B2
(45) Date of Patent: Apr. 22, 2008

(54) IMAGE CONVERSION DEVICE IMAGE CONVERSION METHOD AND IMAGE PROJECTION DEVICE

(75) Inventors: Akihiro Ohta, Tokyo (JP); Hideo Morita, Kanagawa (JP)

(73) Assignee: Sony Corporation, Tokyo (JP)

( * ) Notice: Subject to any disclaimer, the term of this patent is extended or adjusted under 35 U.S.C. 154(b) by 600 days.

(21) Appl. No.: 10/497,746

(22) PCT Filed: Oct. 8, 2003

(86) PCT No.: PCT/JP03/12897

§ 371 (c)(1),
(2), (4) Date: Feb. 7, 2005

(87) PCT Pub. No.: WO2004/034326

PCT Pub. Date: Apr. 22, 2004

(65) Prior Publication Data

US 2005/0180655 A1 Aug. 18, 2005

(30) Foreign Application Priority Data

Oct. 8, 2002 (JP) .............................. 2002-294915

(51) Int. Cl.
*H04N 3/22* (2006.01)
*H04N 3/23* (2006.01)
*H04N 7/01* (2006.01)

(52) U.S. Cl. ...................... 348/745; 348/441; 348/746

(58) Field of Classification Search ........ 348/745–747, 348/806, 807, 441, 448, 453, 458, 459, 616–621; 382/275, 300; *H04N 3/22, 3/23, 3/26, 7/01*
See application file for complete search history.

(56) References Cited

U.S. PATENT DOCUMENTS

| 5,125,042 | A | 6/1992 | Kerr et al. |
| 6,064,444 | A | 5/2000 | Miyazaki et al. |
| 6,367,933 | B1 | 4/2002 | Chen et al. |
| 6,757,026 | B2 * | 6/2004 | Joo .............................. 348/441 |
| 7,129,987 | B1 * | 10/2006 | Westwater .................. 348/441 |
| 2002/0060754 | A1 | 5/2002 | Takeuchi |

FOREIGN PATENT DOCUMENTS

| JP | 2002-135690 | 5/2002 |
| JP | 2002-158946 | 5/2002 |
| JP | 2002-185888 | 6/2002 |

* cited by examiner

*Primary Examiner*—Sherrie Hsia
(74) *Attorney, Agent, or Firm*—Frommer Lawrence & Haug LLP; William S. Frommer; Thomas F. Presson

(57) ABSTRACT

An image processing apparatus for reducing a load of processing of an interpolation operation at the time of a correction of keystone distorted image is provided. The image processing apparatus has an interpolating unit (11, 12) for receiving as input original image data, executing a first interpolation operation a plurality of times with respect to a plurality of original pixel data arranged in one direction of a vertical direction or a horizontal direction in the original image data, executing a second interpolation operation in the other direction, and generating new image data and a storing unit (13) for storing the interpolated data (Va to Vd) obtained by the first interpolation operations, wherein, where a combination of a plurality of original pixel data is the same as a combination used when the interpolated data (Va= to Vd=) already stored in the storing unit (13) were calculated, the interpolating unit (12) reads out that interpolated data from the storing unit (13) and uses the same for the second interpolation operation.

19 Claims, 27 Drawing Sheets

11: VERTICAL DIRECTION INTERPOLATION FILTER
12: HORIZONTAL DIRECTION INTERPOLATION FILTER
13: STORING MEANS
13a: FIRST REGISTER
13b: SECOND REGISTER

PROJECTED IMAGE RANGE BEFORE CORRECTION

101 PROJECTED IMAGE AFTER CORRECTION

INPUT IMAGE

DEFORMED IMAGE OF DISPLAYED IMAGE ON LCD PANEL

PROJECTED IMAGE RANGE BEFORE CORRECTION

101 PROJECTED IMAGE AFTER CORRECTION

VERTICAL DIRECTION INCLINATION ANGLE

INPUT IMAGE

DEFORMED IMAGE OF DISPLAYED IMAGE ON LCD PANEL

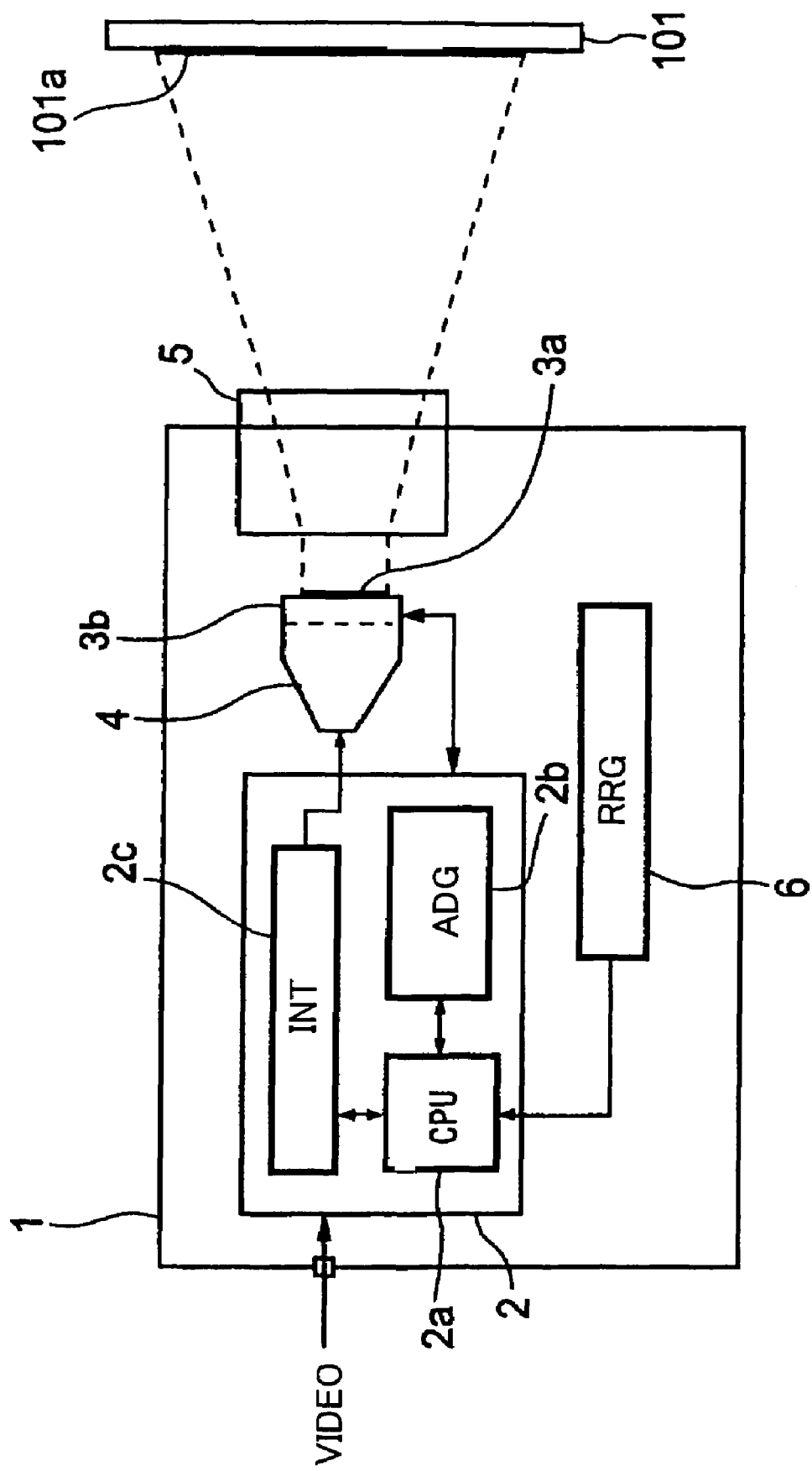

11: VERTICAL DIRECTION INTERPOLATION FILTER
12: HORIZONTAL DIRECTION INTERPOLATION FILTER
13: STORING MEANS
13a: FIRST REGISTER
13b: SECOND REGISTER

FIG. 9A
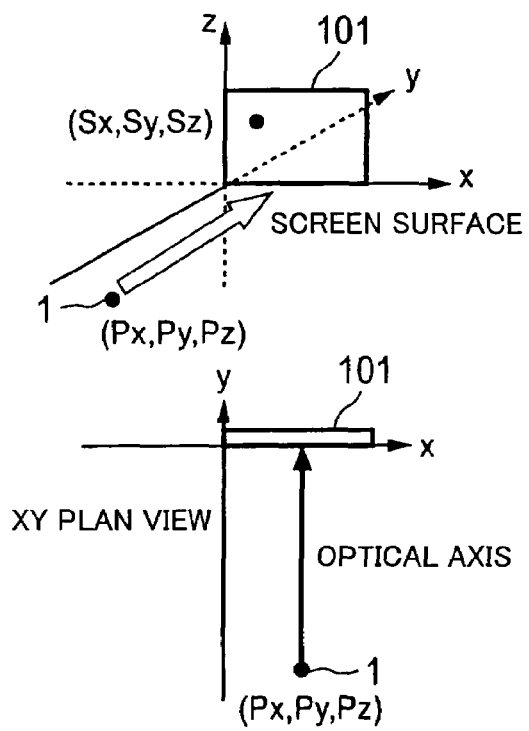
FIG. 9B
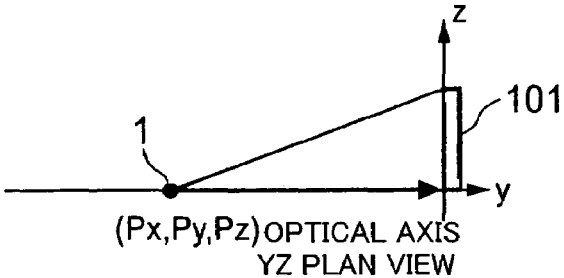
FIG. 9C
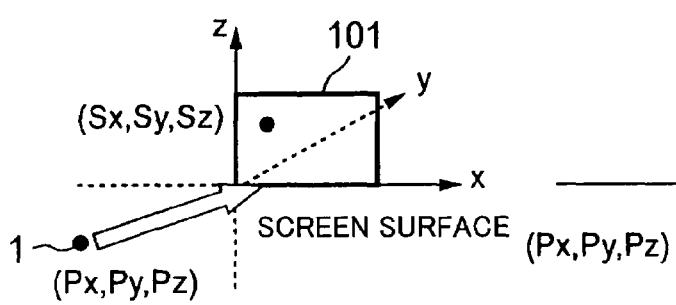
FIG. 10A
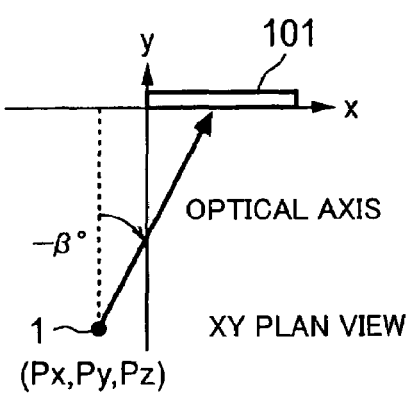
FIG. 10B
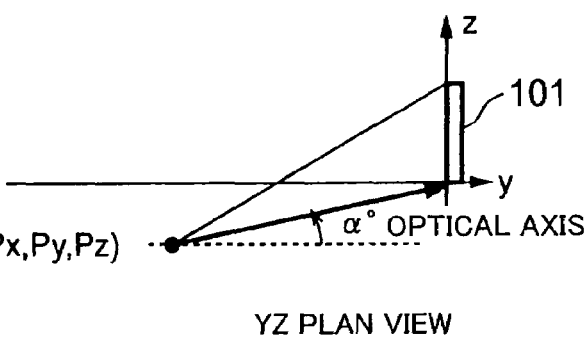
FIG. 10C

CONVERSION MAKING SCREEN FACE FRONT

COORDINATE CONVERSION BY EQUATION
(2-1) AND (2-3) WHERE $\alpha = 10$ AND $-\beta = -30$

PROJECTION FROM BOTTOM RIGHT TOWARD SCREEN

↕ EQUIVALENT

↕ EQUIVALENT

PROJECTION FROM TOP LEFT TOWARD SCREEN
FIG. 16A-1      FIG. 16B-1
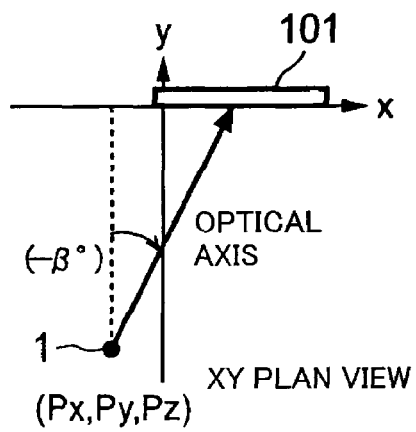
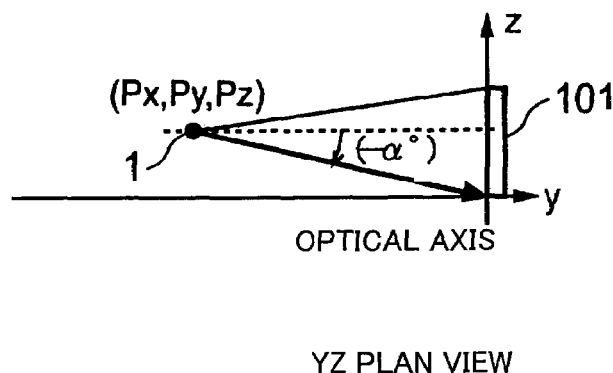
↕ EQUIVALENT      ↕ EQUIVALENT
FIG. 16A-2      FIG. 16B-2
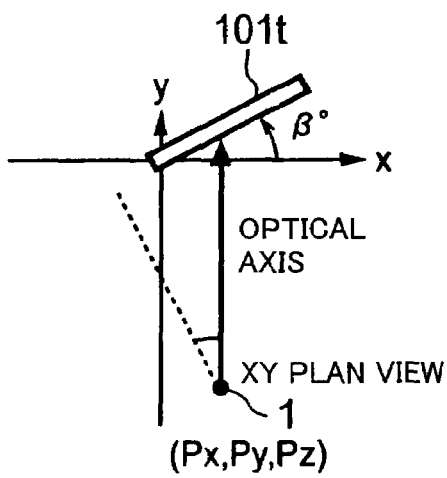
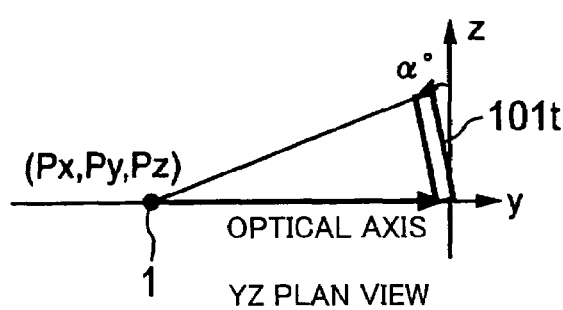

PROJECTION FROM TOP RIGHT TOWARD SCREEN

XY PLAN VIEW

YZ PLAN VIEW

↕ EQUIVALENT

↕ EQUIVALENT

XY PLAN VIEW

FIG. 23A
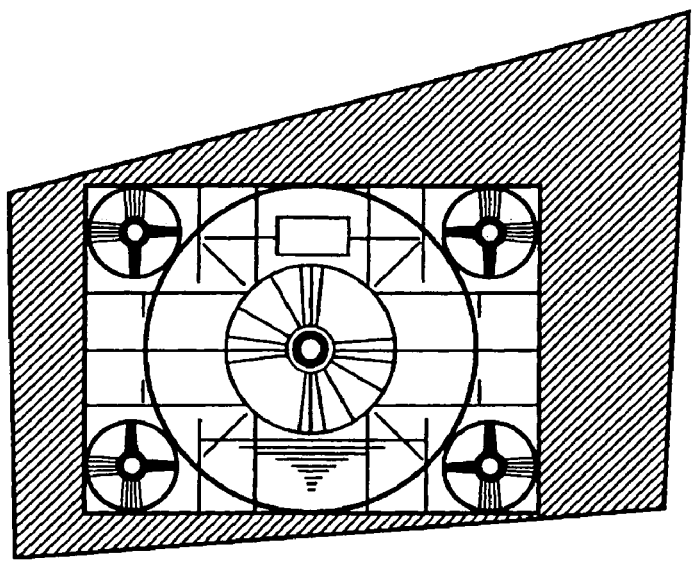
FIG. 23B
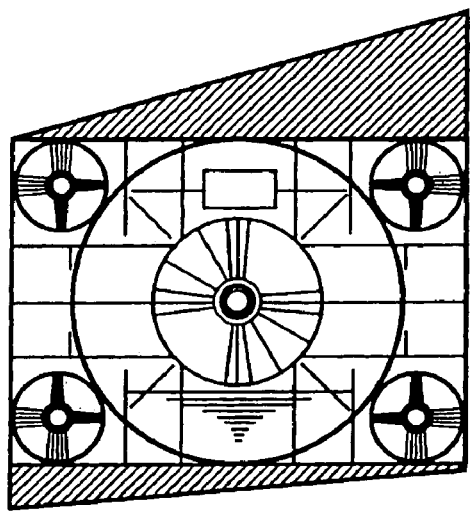
 VERTICAL INTERPOLATION OPERATION
FIG. 23C
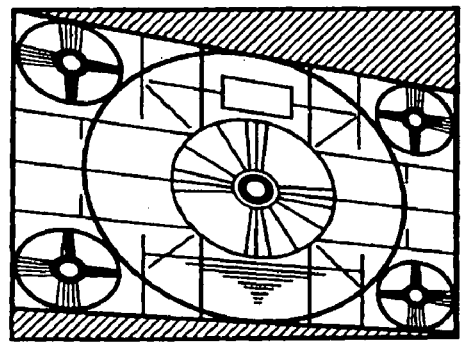

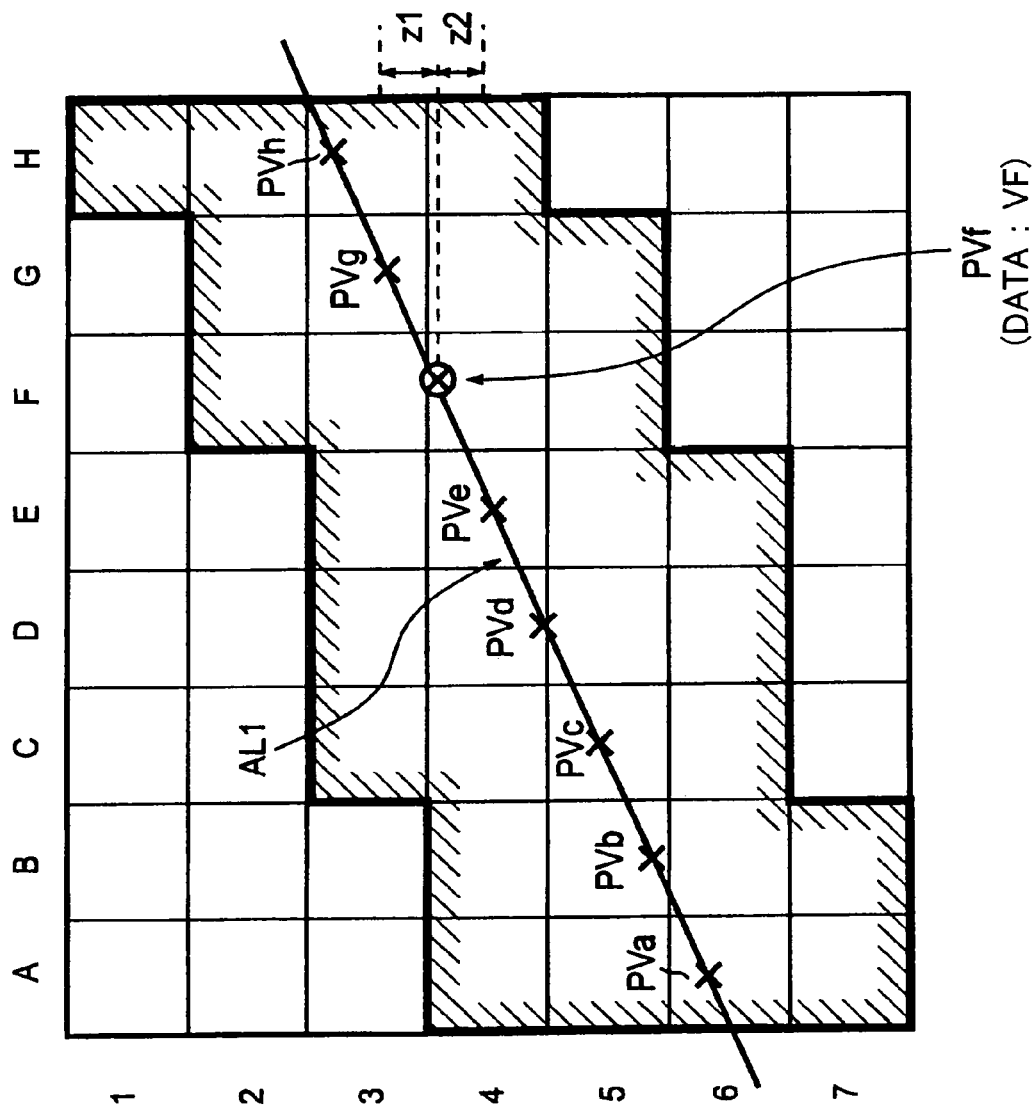

FIG. 26A
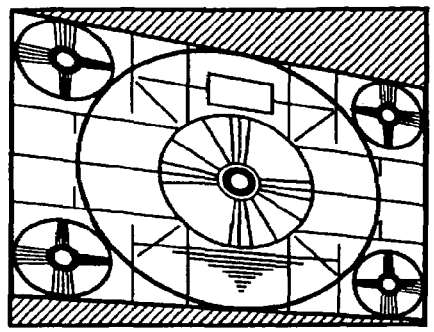
FIG. 26B
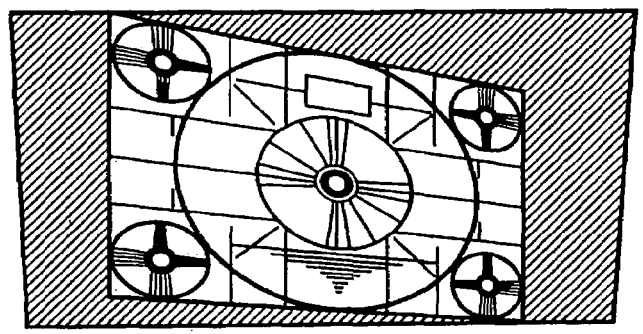
 HORIZONTAL INTERPOLATION OPERATION
FIG. 26C
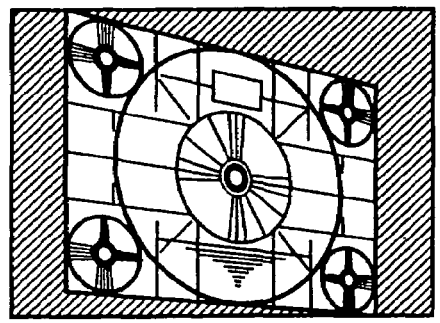

USED INTERPOLATED DATA

□ PIXEL OF ORIGINAL IMAGE
▨ INTERPOLATED PIXEL DATA
● INTERPOLATED PIXEL CENTER
↑ CORRECTION SCANNING LINE

ADDRESS CONVERSION

IMAGE

Va~Vd : ONE-DIMENSIONAL
         INTERPOLATED DATA

IMAGE CONVERSION DEVICE IMAGE CONVERSION METHOD AND IMAGE PROJECTION DEVICE

TECHNICAL FIELD

The present invention relates to an image conversion apparatus and an image conversion method for converting an input original image to a new image by an interpolation operation and to an image projection apparatus for generating data of an image having distortion corrected on a substantially vertical projection surface by an interpolation operation.

BACKGROUND ART

An image projection apparatus referred to as a "projector" has a display means, for example, an LCD (liquid crystal display). The display means is made to display the image and project the image onto a projection surface such as an external screen. At this time, if a projection angle of the image from the liquid crystal projector with respect to the projection surface is inclined, the image which should inherently be rectangular becomes distorted in a trapezoidal state on the screen.

For this reason, a liquid crystal projector provided with a so-called keystone correction function for reversely distorting the image on the liquid crystal panel to correct the trapezoidal distortion of the image on the screen has been known.

Usually, a projector is provided with a pixel number conversion function in accordance with the type or resolution of various input images or for realizing a PinP (Picture in Picture) function. As the function for pixel number conversion of a projector, there are a function for generating addresses after conversion and an interpolation operation function for generating one pixel data from among a plurality of pixel data selected from an input image by an interpolation operation for every generated address.

FIG. 28A-1, FIG. 28A-2, FIG. 28B-1, and FIG. 28B-2 show an original image, an image after conversion, and images of the address conversion using trapezoidal distortion correction in a horizontal direction as an example.

In the image conversion, generally, as shown in FIG. 28B-1, addresses (pixel position data) of an image having the same distortion as the distortion occurring on the projection surface are generated in accordance with the projection position. Below, addresses of pixels at which such data is to be generated by interpolation will be referred to as "interpolation addresses", and the new data will be referred to as "interpolated pixel data".

In order to generate interpolated pixel data corresponding to the interpolation addresses by the interpolation operation, for example, for each address, a plurality of peripheral original pixel data around the corresponding location of the original image are selected by a predetermined rule and added weighted by a predetermined rule. The data is generated repeatedly to generate all interpolated pixel data, then, as shown in FIG. 28B-2, the group of the generated interpolated pixel data is converted in addresses all together.

In trapezoidal distortion correction in the horizontal direction, the interpolation addresses are not given in parallel with respect to the scanning line direction as in FIG. 28B-1, but are given while being inclined to a certain slant for every line. The intervals between the centers of the interpolation pixels serving as sampling points at this time are not constant and change nonlinearly. Further, the same can be said for lines as well. The intervals between lines are also not constant. When giving interpolation addresses obliquely in this way, generating interpolated pixel data, and allocating them to the interpolation addresses, the result is that an image intentionally distorted reverse to the image on the projection surface as indicated by the image in FIG. 28A-2 is obtained. If projecting this intentionally distorted image onto the projection surface, a rectangular image having distortion cancelled out is obtained.

While correction of distortion in the horizontal direction was explained above, distortion in the vertical direction can also be corrected by the same method. At the time of correction of distortion in the vertical direction, a group of addresses representing the trapezoidal distorted image flaring out upward or downward is generated, and an interpolation operation is carried out at each of the address points.

On the other hand, in the case of projection from a slant having any angles horizontally and vertically with respect to the projection surface, the distortions in the horizontal direction and the vertical direction are combined and the image becomes complicatedly distorted, so generation of a group of addresses representing the distortion is complicated. Note if it were only possible to efficiently generate the group of addresses, the interpolation operation itself could be carried out in the same way as the other case mentioned above.

When including a distortion component in the horizontal direction as mentioned above, as shown in FIG. 28B-1, a line connecting the interpolation addresses will obliquely cross a plurality of horizontal lines (a plurality of horizontal scanning lines) of the original image. For this reason, in the interpolation of a pixel, it is necessary to use the plurality of pixel data of the original image existing around the interpolation address point horizontally and vertically, so a two-dimensional interpolation operation becomes necessary. For this operation, a two-dimensional interpolation filter can be used. Note, generally, use is made of two one-dimensional interpolation filters independent vertically and horizontally for reasons of operation scale, restriction of the bit size of the memory, degree of freedom of setup, etc. For example, by passing the original image data through the vertical one-dimensional interpolation filter first and then further passing the interpolated data generated by this through the horizontal one-dimensional interpolation filter, new pixel data is generated.

FIG. 29 shows an example of a one-dimensional interpolation operation for generating one pixel data by a convolution operation by a four-tap filter.

An interpolation coefficient is determined by the distance between the interpolation position and the pixel data, therefore an interpolation coefficient (filter coefficient) with respect to each phase can be represented by a function h(x) of the distance in an x-axis direction at this time. Accordingly, pixel data g of the illustrated interpolation point Q at this time can be represented by the convolution operation shown in equation (1) using original pixel data A, B, C, and D.

$$q = A \times h(-6/5) + B \times h(-1/5) + C \times h(4/5) + D \times h(9/5) \qquad (1)$$

In actuality, a variety of values can be considered for the interpolation function h(x). Also, the image quality can be changed by changing the characteristics of the interpolation filter.

FIG. 30 shows the configuration of a filter unit particularly performing a one-dimensional filter operation independently two times in an image conversion block.

A filter unit 200 has a vertical interpolation filter (VIF) 201, a horizontal interpolation filter (HIF) 202, a selector (SEL) 203, and a storing means 204. The original pixel data and a set of filter coefficients are input to the vertical interpolation filter 201 first. By passing the original pixel data through the vertical interpolation filter 201, the filter operation shown in equation (1) is executed and interpolated data generated by using for example four vertical direction pixel data is output. This is repeated at for example four columns of pixels around the interpolation point, whereby four vertical direction interpolated data Va, Vb, Vc, and Vd are sequentially output from the vertical interpolation filter 201 to the selector 203. The selector 203 sequentially distributes the four vertical direction interpolated data Va, Vb, Vc, and Vd to predetermined storage portions (or predetermined addresses) in the storing means 204 while switching the output. When the four interpolated data Va, Vb, Vc, and Vd are assembled, the storing means 204 outputs them to the horizontal interpolation filter 202. The horizontal interpolation filter 202 executes a one-dimensional (horizontal direction) filter operation in accordance with the input set of filter coefficients and outputs the result as new pixel data.

In this way, in order to generate one new pixel data, horizontal and vertical (N×M) number of data of the original image, i.e., 4×4=16 data in the above example, are used. In order to generate one new pixel data, the interpolation operation by the N-tap vertical interpolation filter is carried out M number of times (N=M=4 in the above example). For the M number of one-dimensional interpolated data V1, V2, . . . , VM generated by this, an interpolation operation by the M-tap horizontal interpolation filter is executed only one time.

In the interpolation operation processing of a pixel carried out in the image conversion unit of the image projection apparatus mentioned above, the number of the original pixel data extracted is set to N in the vertical direction and M in the horizontal direction (N and M: natural numbers of 2 or more). In general, the higher the order of the interpolation function h(x) of equation (1) used for realizing high precision interpolation, the larger the numbers N and M of this original pixel data extracted and the larger the number of taps of the filter too. Further, in order to perform the distortion correction in the horizontal direction with a high precision, a certain number of original pixel data becomes necessary in not only the horizontal direction, but also the vertical direction. In this case, in order to raise the degree of freedom of placement of the projector, it is important that large distortion of an image can be corrected. From this viewpoint, the numbers N and M of the original pixel data extracted are set large in advance.

In the filter unit 200 having the configuration shown in FIG. 30, when new pixel data is generated, if the interpolated data Va, Vb, Vc, and Vd output from the vertical interpolation filter 201 are input to the storing means 204, the interpolated data Va=, Vb=, Vc=, and Vd= used for the generation of the pixel data before that are rewritten. With the filter unit 200 of this configuration, M (four in the present example) number of interpolated data are generated for every generation of new image data.

In the filter unit 200 illustrated in FIG. 30, however, some of the interpolated data are often the same at the time of generation of continuous image data. In this case, wasteful processing for generating data the same as already generated and stored data and rewriting the stored content in the storing means 204 by this is carried out. In order to improve the precision of the interpolation processing or the degree of freedom of the arrangement of the projector, when the numbers N and M of the original pixel data extracted are large, the same operation is often repeated in the vertical interpolation filter 201. Further, the frequency of repetition of operations of the same content in this vertical interpolation increases as the vertical direction distortion component becomes dominant in comparison with the horizontal direction distortion component. Further, even when there are few wasted repeated operations, the generation of addresses of the oblique distortion correction was complex, so the processing time sometimes increased.

In the image projection apparatus mentioned above, wasted repetition of the same operations frequently occurred due to the above reason or the improvement of the overall operation speed was unnecessarily limited due to the complicated address computations. For this reason, various restrictions arose, for example, the clock frequency etc. of the portions communicating with the memory had to be raised or the bit size of the memory had to be increased.

DISCLOSURE OF THE INVENTION

A first object of the present invention is to provide an image conversion apparatus and an image conversion method improving a processing speed of an interpolation operation and reducing a load on a required memory.

A second object of the present invention is to provide an image projection apparatus for generating data of an image able to correct distortion on a projection surface by using a method of an interpolation operation able to improve the processing speed of the interpolation operation and reduce the load on the memory.

According to a first aspect of the present invention, there is provided an image conversion apparatus comprising an interpolating means for executing a first interpolation operation by a plurality of original pixel data arranged in one direction of either a vertical or horizontal direction of the input original image, executing a second interpolation operation in the other direction different from the one direction by using a plurality of interpolated data obtained by the first interpolation operation, and generating new image data at an interpolation point, and a storing means for storing the interpolated data obtained by the first interpolation operation, wherein the interpolating means reads out the interpolated data from the storing means if a combination of the plurality of original pixel data is the same as a combination used when calculating the interpolated data already stored in the storing means and uses the same for the second interpolation operation.

According to a second aspect of the present invention, there is provided an image projection apparatus having a display means having display pixels arranged in a matrix in first and second directions orthogonal to each other and a projecting means for projecting an image displayed on the display means to a projection surface by utilizing light from a light source and having a function of converting an input original image to an image having distortion corrected in accordance with an angle of the projection with respect to a normal line of the projection surface when projecting the image to the projection surface, comprising an address generating means for generating addresses of an image suffering from distortion linked with positions of the display on the display means; a mapping means for linking pixel positions of the original image without distortion with the addresses of the image suffering from distortion; a selecting means for selecting a plurality of original image data in the second direction for every intersecting point based on intersecting points between an address line of the image suffering from distortion generated by the address generating means corresponding to the displayed pixels arranged in the first direction and a plurality of lines connecting the pixels in the second direction; and an interpolating means for executing a first interpolation operation at the intersecting points used as the reference at the time of the selection with respect to each set of selected original pixel data, executing a second interpolation operation in the first direction with respect to the obtained plurality of interpolated data, and generating new pixel data to be displayed on the display means based on a correspondence between the address and the position information obtained from the mapping means.

According to a third aspect of the present invention, there is provided an image projection apparatus having a display means having display pixels arranged in a matrix in first and second directions orthogonal to each other and a projecting means for projecting an image displayed on the display means to a projection surface by utilizing light from a light source and having a function of converting an input original image to an image having distortion corrected in accordance with an angle of the projection with respect to a normal line of the projection surface when projecting the image to the projection surface, comprising an address generating means for finding first interpolation addresses by a first relationship equation with a coefficient of a coordinate parameter of the first direction in coordinates based on the pixel position of the original image set as "1", finding second interpolation addresses by a second relationship equation with a coefficient of a coordinate parameter in the second direction set as "1" and generating addresses of the image suffering from distortion; a mapping means for linking positional information of the original image without distortion with the addresses of the image suffering from distortion; and an interpolating means for finding positions of intersecting points between an address line of the image suffering from distortion generated by the address generating means corresponding to the displayed pixels in the first direction and a plurality of lines connecting the original pixels in the second direction by using the first interpolation addresses, executing the first interpolation operation at the intersecting points, executing the second interpolation operation at the interpolation points found by using the second interpolation addresses with respect to the obtained plurality of interpolated data, and generating new pixel data to be displayed on the display means based on correspondences of the addresses obtained from the mapping means.

According to a fourth aspect of the present invention, there is provided an image conversion method comprising a first interpolation step of repeatedly executing a first interpolation operation by a plurality of original pixel data arranged in one direction of either the vertical or horizontal direction of an input original image; a data storage step of temporarily storing a plurality of interpolated data generated by the first interpolation operation in a storing means; a second interpolation step of generating new pixel data by executing a second interpolation operation with respect to a plurality of the interpolated data in the other direction different from the one direction; and a step of generating new pixel data by repeating the first interpolation step, the data storage step, and the second interpolation step, wherein, in the step of generating the new pixel data, if the combination of plurality of the original pixel data is the same as a combination used when calculating the interpolated data already stored in the storing means, the interpolated data is read out from the storing means and used for the second interpolation operation.

According to a fifth aspect of the present invention, there is provided an image conversion method for converting an input original image projected onto a projection surface by utilizing light to an image having distortion corresponding to an angle of the projection corrected on the projection surface by using interpolation processing and outputting the same to a display means, comprising a step of generating addresses of the image suffering from distortion; a step of mapping linking pixel positions of the original image without distortion with the addresses of the image suffering from distortion; a step of selecting a plurality of original image data for every intersecting point based on intersecting points between an address line of the image suffering from distortion generated by the address generating means corresponding to the display position of the display means in a first direction between the horizontal and vertical directions and a plurality of lines connecting the pixels in a second direction different from the first direction; a step of executing a first interpolation operation at the intersecting points used as the reference at the time of selection for each set of selected original image data; and a step of executing a second interpolation operation in the horizontal direction with respect to a plurality of interpolated data obtained by the first interpolation operation and generating new pixel data to be displayed on the display means based on a correspondence of addresses obtained by the mapping.

According to a sixth aspect of the present invention, there is provided an image conversion method comprising an address generation step of generating first interpolation addresses by a first relationship equation with a coefficient of a coordinate parameter of a first direction between the horizontal and vertical directions set as "1" and generating a second interpolation address by a second relationship equation with a coefficient of a coordinate parameter of a second direction different from the first direction set as "1"; a first interpolation step of selecting a plurality of original pixel data arranged in the second direction of the input original image by using the first interpolation addresses and repeatedly executing the first interpolation operation a plurality of times; and a second interpolation step of selecting a plurality of interpolated data arranged in the first direction generated by the first interpolation operation by using the second interpolation addresses, executing a second interpolation operation at the interpolation points, and generating new pixel data.

BRIEF DESCRIPTION OF THE INVENTION

FIG. 5 is a view of the basic configuration of a projector in the first to third embodiments of the present invention.

FIG. 9A is a view of positional relationships between the projector and a screen in a right hand coordinate system in the case of front projection; FIG. 9B is a yz plan view; and FIG. 9C is an xy plan view.

FIG. 10A is a view of positional relationships between the projector and a screen in a right hand coordinate system in the case of a vertical projection angle of α degrees and a horizontal projection angle of β degrees; FIG. 10B is a yz plan view; and FIG. 10C is an xy plan view.

FIG. 15A-1 to FIG. 15B-2 are an xy plan view and a yz plan view of a right hand coordinate system at the time of projection from the bottom right toward the screen and plan views equivalent to them.

FIG. 16A-1 to FIG. 16B-2 are an xy plan view and a yz plan view of a right hand coordinate system at the time of projection from the top left toward the screen and plan views equivalent to them.

FIG. 17A-1 to FIG. 17B-2 are an xy plan view and a yz plan view of a right hand coordinate system at the time of projection from the top right toward the screen and plan views equivalent to them.

FIG. 23A is a view of an image obtained by mapping an image without distortion at addresses of a distorted image at the time of oblique projection; FIG. 23B is a view of an image of the address map limiting an interpolation region; and FIG. 23C is a view of an image of the address map after the interpolation operation in the vertical direction.

FIG. 24 is an explanatory view of a vertical interpolation position for every line.

FIG. 26A is a view of an image of the address map of a vertical interpolated image; FIG. 26B is a view of an image of the address map after image combination; and FIG. 26C is a view of an image of the address map after horizontal interpolation.

FIG. 28A-1 to FIG. 28B-2 are views of an original image at the time of trapezoidal distortion correction in the horizontal direction, the image after the conversion, and the image after the address conversion.

BEST MODE FOR WORKING THE INVENTION

Figure 1:
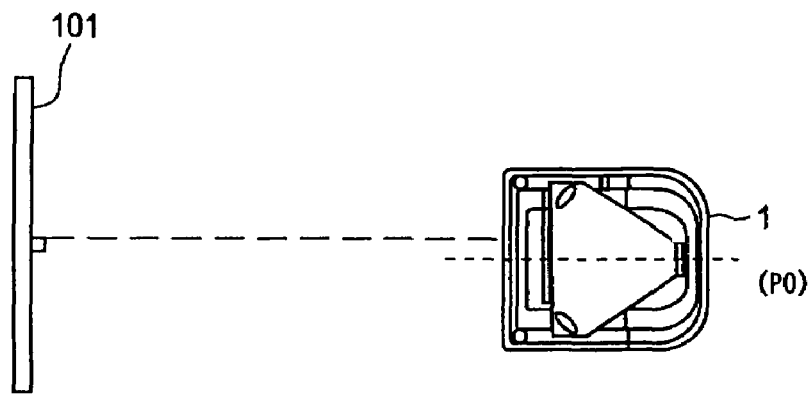
FIG. 1 is a view of arrangement of a front projector seen from above at the time of front projection in first to third embodiments of the present invention.

Embodiments of an image projection apparatus (projector) and an image conversion method and apparatus of the present invention will be explained next by referring to the drawings.

FIG. 1 shows a view of the arrangement of a front projector seen from above at the time of front projection.

In FIG. 1, the short broken line on the lower side shows the center line of a projector body, while an upper long broken line is a line connecting the center of the lens in the projector and the center of the screen.

A projector 1 and a screen 101 are arranged so that the center axis of the projection light indicated by the long broken line and the projection surface on which the video is projected, for example, the screen 101, are orthogonal when seen from above. The video projected by the projector 1 is a television video signal or signal of a computer screen. The shape of the display region of the video superimposed on these signals is a square having a ratio of the length of the sides (aspect ratio) of 4:3 or 16:9 as the overall video, although there is a difference in the number of pixels according to the signal, as can be understood also from a television receiver and a computer display. If the square video displayed on the LCD panel of the projector 1 is not straightly projected, the projected video will also not become square and consequently the original shape of the video will be distorted.

Figure 2:
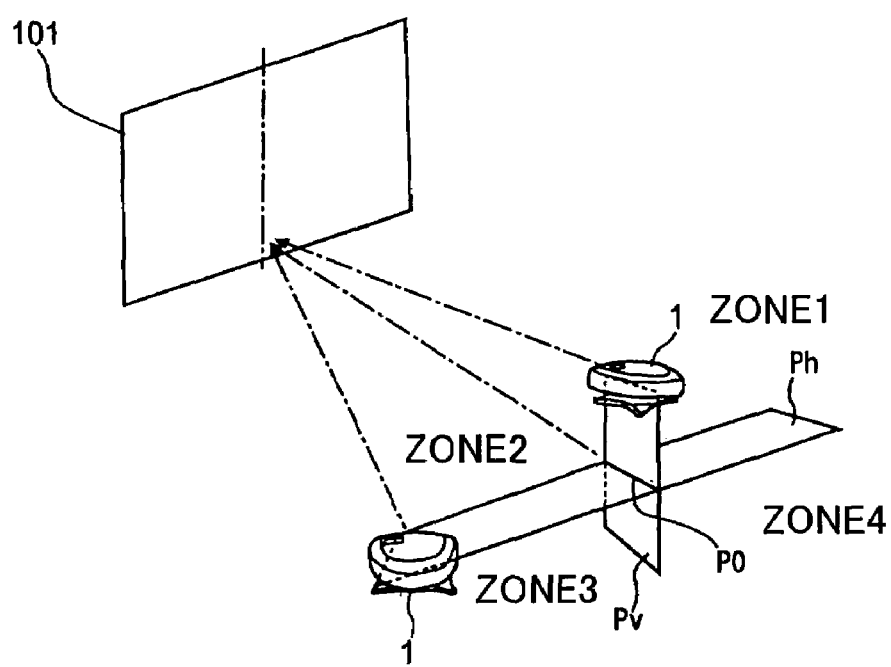
FIG. 2 is a view of a range of possible arrangement of a projector in the first to third embodiments of the present invention centered around the position of front arrangement.

FIG. 2 is a view of a range where the projector 1 can be arranged in an embodiment of the present invention where the center position of the projector arranged at the front is P0.

The projector 1 can be arranged in a horizontal plane Ph including the front position P0 and can be arranged in a vertical plane Pv including the front position P0. Further, the projector 1 can be freely arranged in any of a first quadrant ZONE1, a second quadrant ZONE2, a third quadrant ZONE3, and a fourth quadrant ZONE4 defined by the two planes Ph and Pv.

The projector 1 can project the image of the LCD panel inside it from any position so far as the position is within the above mentioned range. The projector 1 has a function of correcting the distortion of the image in accordance with the projection position. Accordingly, when it is made to function in this way, the image of a regular square having the same aspect ratio as that when projected from exactly the front surface can be projected onto the screen 101. This correction will be referred to as "keystone distortion correction".

Figure 3A:
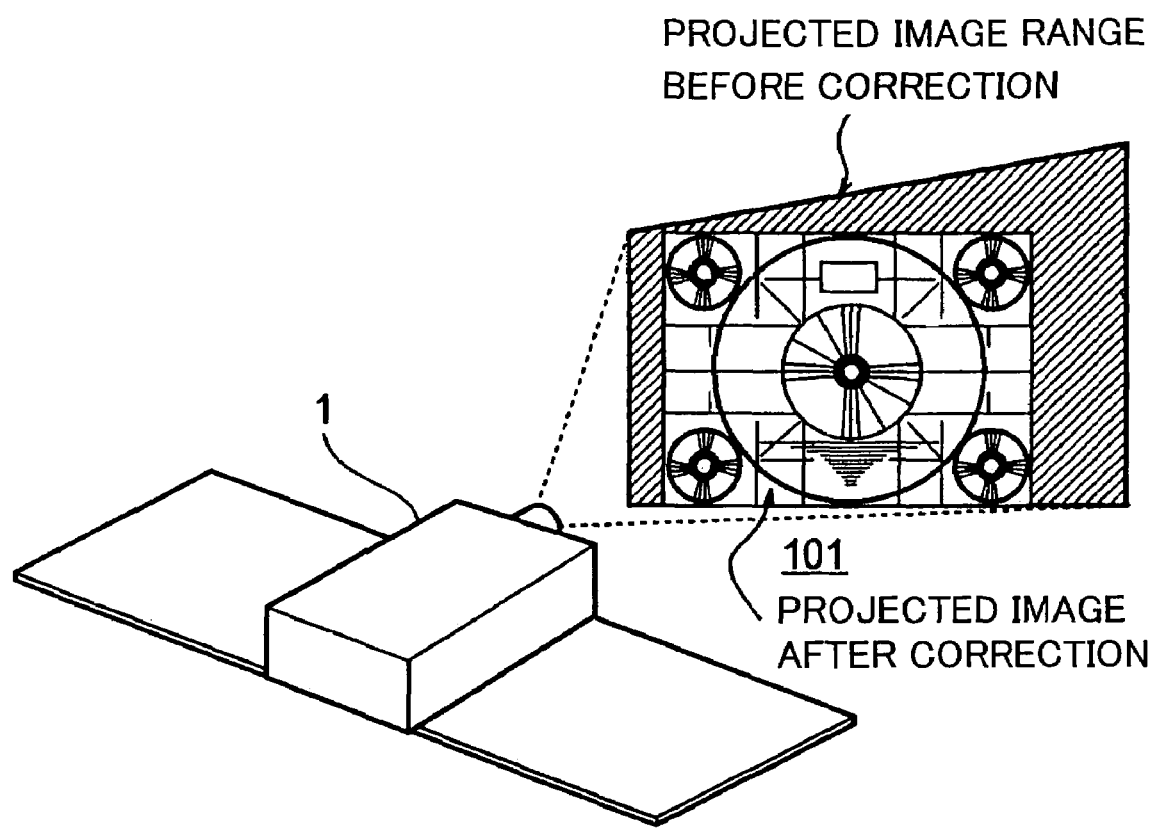
FIG. 3A is a view of the time of image projection from the side.
Figure 3B:
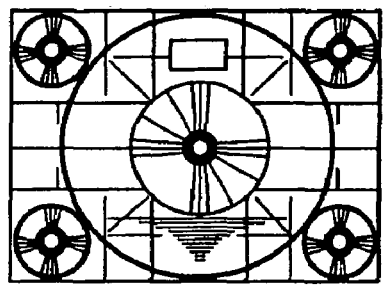
FIG. 3B is a view of an input image.
Figure 3C:
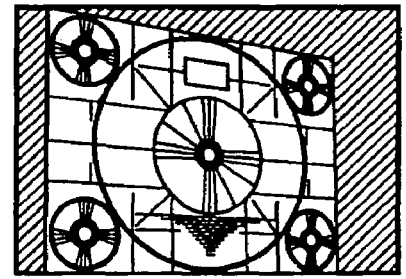
FIG. 3C is a view of an image on an LCD panel surface.

FIG. 3A shows an image projected from the left side toward the screen in the horizontal plane. FIG. 3B shows the input image; while FIG. 3C shows the image on the LCD panel surface built into the projector.

As shown in FIG. 3A, the projector 1 is arranged and projects an image at the left side toward the screen 101, but the video on the screen 101 appears as if the image were projected from the front. Originally, the projected screen would have been deformed with the entirety distorted to a trapezoid including the hatching portion in the figure. This will be referred to as a "horizontal keystone deformation". Correction of the horizontal keystone deformation will be referred to as "horizontal keystone correction".

In order to project an image from the projector 1 placed at side in this way and project the video on the screen 101 as if it was projected from the front, it is necessary to calculate in advance how the image would be distorted according to the projection position of the projector 1. At this time, by forming the image artificially distorted in the reverse direction with respect to the shape of distortion when the video is projected from the side and projecting it, even if the video is projected from the lateral direction, it can be made to appear the same way as that at the time when the image is projected from the front. In order to obtain the projected video as in FIG. 3A in the above example, the input image of FIG. 3B is intentionally deformed on the LCD panel surface as shown in FIG. 3C, and this image is projected onto the screen 101.

Figure 4A:
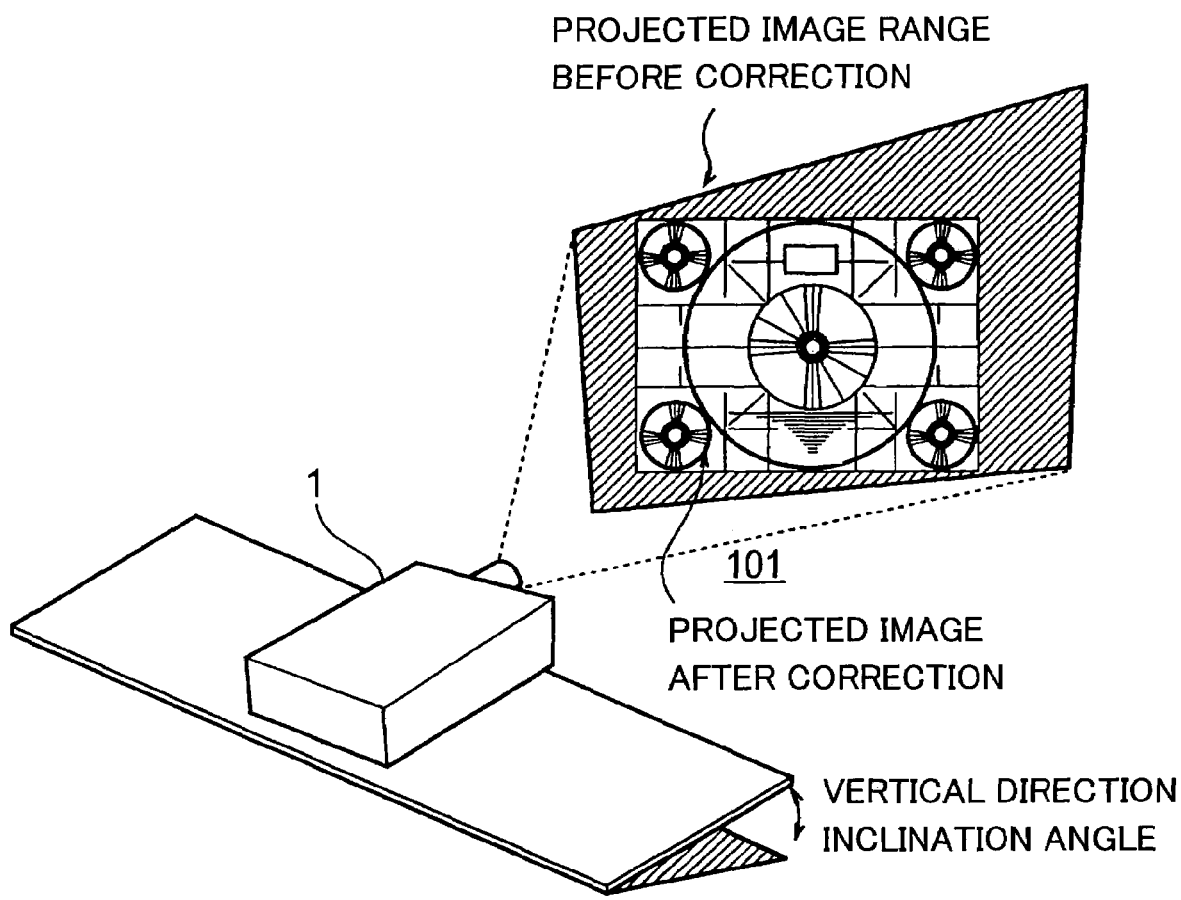
FIG. 4A is a view of the time of oblique projection from a position offset in both the horizontal and vertical directions from the front position.
Figure 4B:
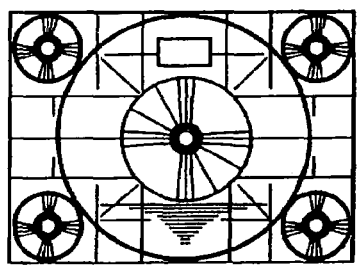
FIG. 4B is a view of an input image.

FIG. 4A shows an image projected from the third quadrant ZONE3 in FIG. 2. Further, FIG. 4B shows the input original image; while FIG. 4C shows the image on the panel surface of the LCD.

The horizontal keystone distortion of FIG. 3A was trapezoidal distortion, but in the case of FIG. 4A in which the distortion component in the vertical direction is added to this, the distortion shape becomes further complex. When it is desired to obtain the regular square projection image after the correction shown in FIG. 4A, the LCD panel image must be made an image as if the image were rotated in the LCD panel surface as shown in FIG. 4C.

Figure 4C:
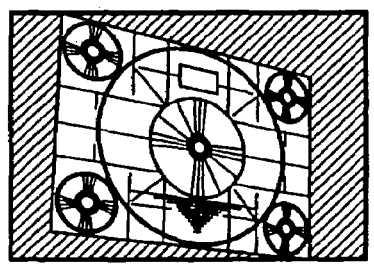
FIG. 4C is view of an image on the panel surface of LCD.

In both of the cases of FIG. 4C and FIG. 3C described above, if the image intentionally distorted reversely to the projection image shape before the correction is displayed fully over the effective display region of the LCD panel surface, a correct square projection image having the drop in the resolution and brightness suppressed as much as possible is obtained on the screen.

Below, embodiments of the image projection apparatus and the image projection method able to perform such correction by converting the input image to the image of the LCD panel will be explained in more detail. In this image conversion, the general formula of the address generation able to simultaneously correct horizontal and vertical distortions is found taking as an example the case of projection from the third quadrant ZONE3 as shown in FIG. 4A. An image distorted in only the horizontal or only the vertical direction can be expressed by the case where the horizontal or vertical projection angle is zero in this general formula. Further, the concept of projection from another quadrant other than the third quadrant ZONE3 is the same except only the formula is different.

First Embodiment

FIG. 5 shows the basic configuration of a projector.

The projector 1 has a circuit portion 2 including a circuit for applying various signal processing to a video signal (input video signal) VIDEO and circuits of various driving systems. The circuit portion 2 includes, in part of the signal processing circuit, a central processing unit (CPU) 2a as the control means and the processing means of the present invention, an address generation unit (ADG) 2b as the address generating means of the present invention, and a data interpolating means (INT) 2c. The projector 1 has a display means 3b for displaying an image 3a obtained by converting an original image indicated by a signal obtained by applying various signal processing to the input video signal VIDEO, for example, an LCD panel. Further, the projector 1 has a projecting unit 4 including a light source for illuminating the display means 3b and an optical unit 5 including various lenses for projecting the image 3a of the display means 3b illuminated by the projecting unit 4. The LCD panel 3 may be any of a transmission type or a reflection type. In either case, the image 3a is projected on a substantially perpendicular projection surface, for example, the screen 101, through the optical unit 5 as a projected image 101a. Three LCD panels 3 are provided for the RGB colors. The images of the different colors are combined in the optical unit 5.

The CPU 2a is one of the interpolating means in the broad sense since it controls the data interpolation. The CPU 2a and the data interpolating means 2c constitute one embodiment of the "interpolating means" in the present invention. The CPU 2a acts also as a selecting means for selecting the original pixel data and a mapping means for mapping for finding the relative relationship between addresses. The CPU 2a also has a role of controlling the rest of the configuration. Details of the computation and the mapping of the representative point address will be explained later. Further, the "storing means" in the present invention is provided inside the data interpolating means 2c, though not illustrated in the example illustrated in FIG. 5.

The projector 1 has a means 6 for getting the relative relationship data indicating the relative relationship of images between the LCD panel 3 and the screen 101 (hereinafter referred to as the "relative relationship getting means"). The relative relationship getting (RRG) means 6 may take various forms, for example, an input unit for receiving as input the relative relationship data from the outside, an external operating means (button etc.), a storing means (for example, a ROM) storing the envisioned relative relationship data in advance, or a means for detecting the relative relationship by itself. The relative relationship getting means 6 gets for example at least a distance of the image up to the screen 101 and the angle formed by the optical axis of the optical unit 5 and the screen surface.

In a projector using a liquid crystal panel or other panel with fixed pixels, sometimes the number of pixels of the input original image and the number of pixels of the output image will be different. For this reason, the projector is provided with a signal processing function for converting the number of pixels. This will be referred to as a "scaling function". In this processing, data at a position where the pixel data originally does not exist becomes necessary, so pixels are interpolated. In the interpolation operation, the pixel data of a target position is formed by using the data of the peripheral pixels. This function is realized by building in for example a circuit block referred to as a "scaler" in an image processing circuit referred to as an "image processor".

Figure 6:
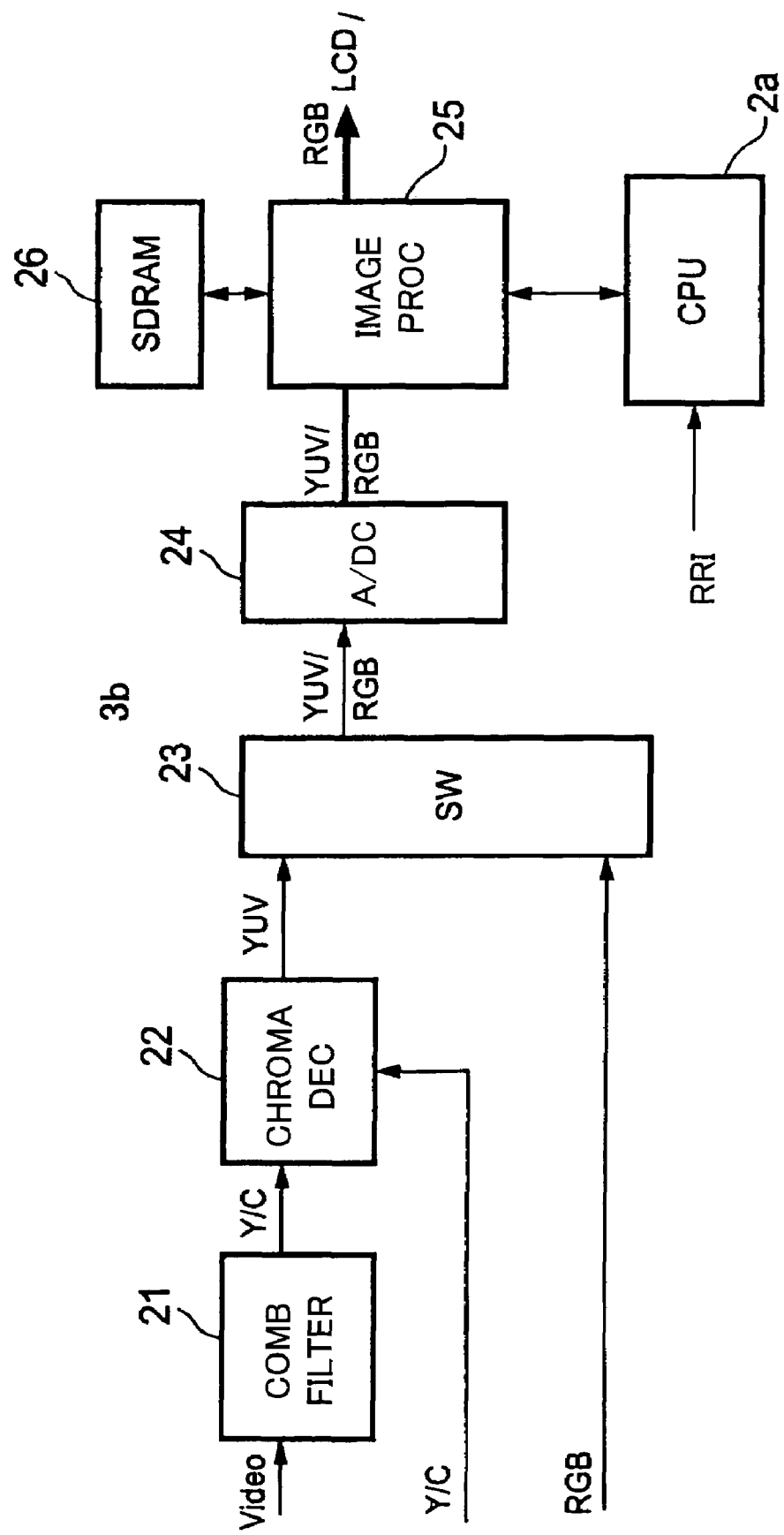
FIG. 6 is a block diagram of an example of the configuration of an image processor and peripheral circuits thereof included in the circuit portion of FIG. 5 in a projector of the first to third embodiments of the present invention.

FIG. 6 is a view of an example of the configuration of the image processor included in the circuit portion 2 of FIG. 5 and the circuit block on the periphery thereof.

The illustrated image processing circuit has a comb filter 21, a chroma decoder 22, a select switch (SW) 23, an analog-digital converter (A/DC) 24, an image processor 25, an image memory 26 made of an SDRAM, etc., and a CPU 2a. Among these, the image processor 25 and the CPU 2a are concrete examples of the configuration for realizing the function of image conversion. Note that it is also possible to integrally form the functions of these image memory 26 and the CPU 2a in the image processor 25.

The illustrated image processing circuit can handle a video signal of any of a composite video signal, a Y/C signal, and an RGB signal. The composite video signal is input to the comb filter 21, the Y/C signal is input to the chroma decoder 22, and the RGB signal is input to the select switch 23. When considering the case where a composite video signal is input, it is converted to the Y/C signal at the comb filter 21 and converted to a YUV signal at the subsequent chroma decoder 22. The signal selected by the select switch 23 is converted by the A/DC 24 and becomes a digital signal. This signal is input to the image processor 25, where the desired signal processing is carried out. At this time, the processing of the image processor 25 is controlled by the CPU 2a to which the relative relationship information RRI is input. The image memory 26 is appropriately used during the processing. After the desired signal processing is carried out, the processed signal is sent to the display means, for example, the LCD panel 3. The image to be projected is displayed on the LCD panel 3 based on this signal.

Figure 7:
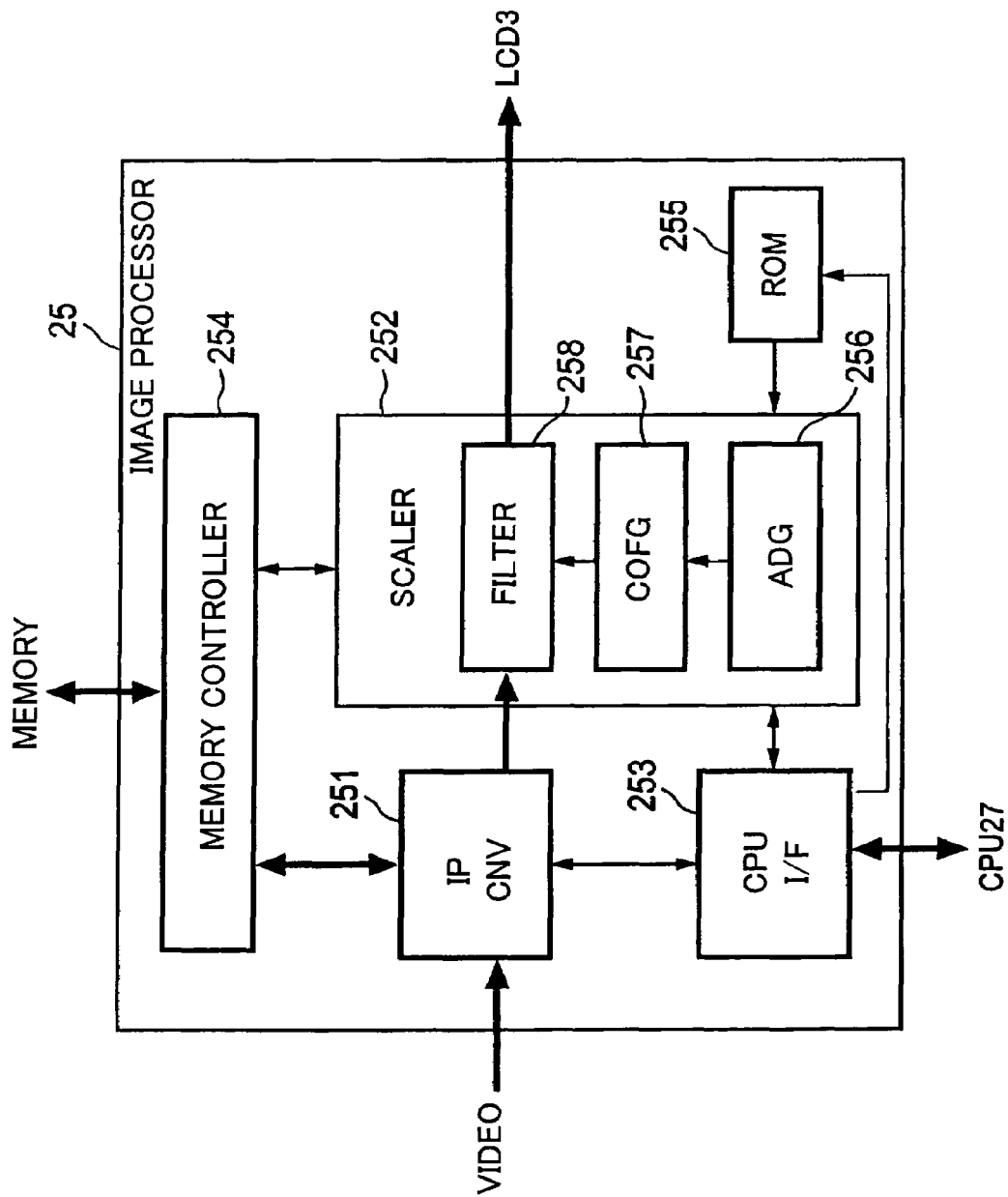
FIG. 7 is a block diagram of an example of the configuration of a circuit inside the image processor.

FIG. 7 shows an example of the configuration of the circuit block inside the image processor.

The image processor 25 has an IP (interlace-progressive) conversion unit 251, a scaler 252, a CPU interface 253, a memory control unit 254, and a read only memory (ROM) 255. The scaler 252 has an address generation unit 256 as an embodiment of the address generating means 2b shown in FIG. 5, a coefficient generation unit 257, and a filter unit 258 as an embodiment of the data interpolating means 2c shown in FIG. 5. Among them, the coefficient generation unit 257 and the filter unit 258 and the CPU 2a shown in FIG. 6 constitute an embodiment of the "interpolating means" in the present invention.

The video signal input to the image processor 25 is sent to the IP conversion unit 251, where an interlace signal is converted to a progressive one. In this processing, the image memory 26 is used. By the connection of the IP conversion unit 251 to the memory control unit 254 as the memory interface, the IP conversion unit 251 transfers the image data with the image memory 26. The signal made progressive is sent to the scaler 252 for the scaling. Inside the scaler 252, addresses necessary for distortion correction are generated at the address generation unit 256. The coefficient generation unit 257 is made to generate filter coefficients and supply the generated filter coefficients to the filter unit 258. The filter unit 258 performs the interpolation operation using the given filter coefficients to convert the original image indicated by the input video signal to an image of the LCD panel having the predetermined size and shape. The signal of the converted image is output and sent to the LCD panel 3. The ROM 255 for holding the data such as the filter coefficients used in this interpolation operation is connected to the scaler 252. The interface 253 of the CPU 2a for controlling the image processing including this series of processing is connected to the IP conversion unit 251, the scaler 252, and the ROM 255.

Figure 8:
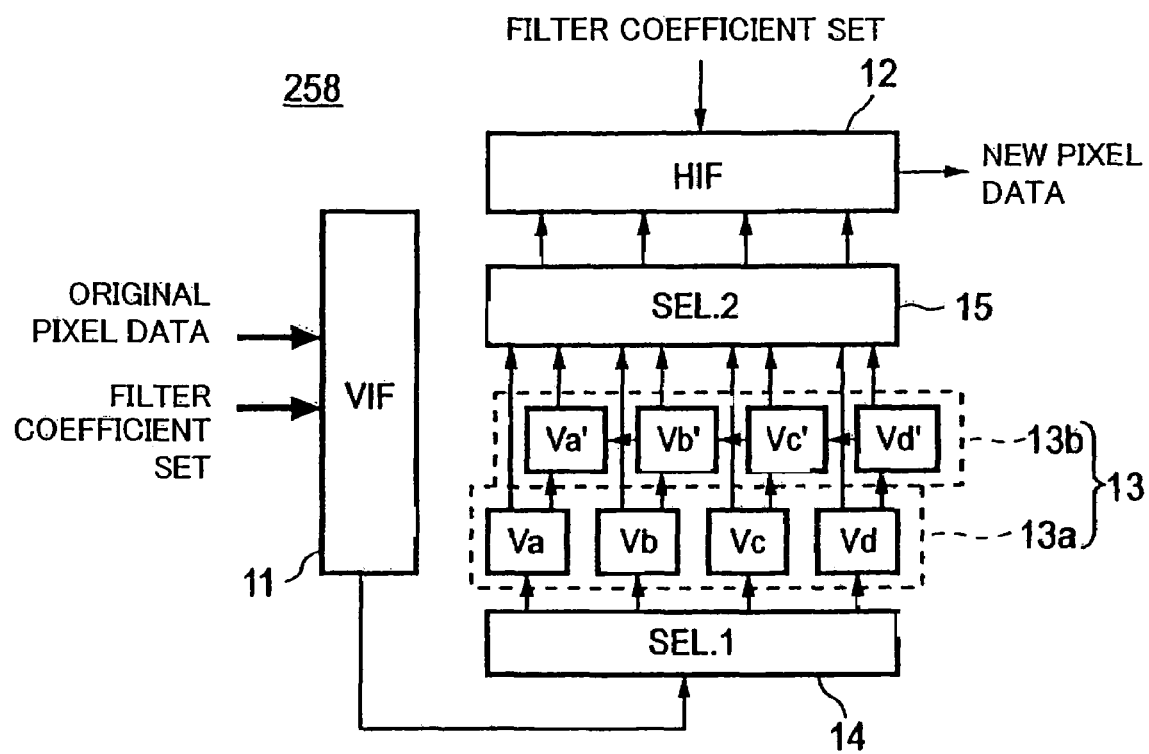
FIG. 8 is a block diagram of the configuration of a filter unit in the first and second embodiments of the present invention.

FIG. 8 is a block diagram of the configuration of the filter unit 258.

The filter unit 258 includes a vertical direction interpolation filter (VIF) 11, a horizontal direction interpolation filter (HIF) 12, a storing means 13, and two selectors (SEL) 14 and 15. The storing means 13 includes a first register 13a and a second register 13b.

The original data and the vertical direction set of filter coefficients are input to the vertical direction interpolation filter 11. The output of the vertical direction interpolation filter 11 is connected to the input of the selector 14, while the output of the selector 14 is connected to the first register 13a. The output of the first register 13a is connected to the input of the second register 13b and the input of the selector 15. The output of the selector 15 is connected to the horizontal direction interpolation filter 12. The horizontal direction set of filter coefficients is input to the horizontal direction interpolation filter 12. New pixel data is output from the horizontal direction interpolation filter 12.

When the original pixel data and the set of filter coefficient are first input to the vertical direction interpolation filter 11, the required original pixel data is selected by the CPU 2a and the selected original pixel data is passed through the vertical direction interpolation filter 11, whereby a one-dimensional (vertical direction) filter operation is executed. The interpolation filter 11 outputs interpolated data generated by using for example four pixel data in the vertical direction. This is repeated at for example four pixel trains at the periphery of an interpolation point, whereby four interpolated data Va, Vb, Vc, and Vd in the vertical direction are sequentially output from the vertical direction interpolation filter 11 to the selector 14. The selector 14 distributes the four vertical direction interpolated data Va, Vb, Vc, and Vd to predetermined storage portions (or predetermined addresses) in the first register 13a while switching the output. When four interpolated data Va, Vb, Vc, and Vd are gathered, the first register 13a outputs them to the second register 13b and the selector 15. The four interpolated data Va, Vb, Vc, and Vd pass through the selector 15 and are input to the horizontal interpolation filter 12. The horizontal direction interpolation filter 12 executes a one-dimensional (horizontal direction) filter operation in accordance with the input set of filter coefficients and outputs the result as new pixel data.

In the same way as above, new pixel data are generated one after another. In order to generate one new bit of pixel data, four filter operations in the vertical direction and one filter operation in the horizontal direction are carried out. The second register 13b has a function of shifting the interpolated data. For this reason, the data transfer is possible, for example, the interpolated data Vc and Vd are shifted up to the position where the interpolated data Va= and Vb= are stored in FIG. 8. Since it has such a shift function, in the second and subsequent generations of the pixel data, the vertical direction filter operation result (interpolated data Va= to Vd=) calculated at the time of the one previous generation of pixel data can be set at the required position of the second register 13b.

The CPU 2a controls the entire filter unit 258 including these registers 13a and 13b and selectors 14 and 15. Further, the CPU 2a controls the filter unit 258 and the coefficient generation unit 257 so as to control the vertical direction interpolation filter 11 so as not to continuously perform processing using the same filter coefficients by the same combination of original images. Instead of this, the vertical interpolation operation result (interpolated data) calculated the previous time is shifted to the required position in the second register 13b and given via the selector 15 to the horizontal direction interpolation filter 12 under the control of the CPU 2a.

Next, an explanation will be given of the address generation of a distorted image.

The relative relationship data from the relative relationship getting (RRG) means 6 is input to the CPU 2a (FIG. 6).

The CPU 2a itself and further the address generation unit 256 in the image processor 25 shown in FIG. 7 under control of the CPU 2a generate the addresses of the distorted image data for efficiently converting an original image.

Below, an explanation will be mainly given of the case where the image of the front projector is obliquely projected from a position oriented upward by α degrees in the vertical direction and rotated to the left by β degrees from the screen front surface in the horizontal direction based on the position of the front surface with respect to the screen.

When the angles α and β are positive, the projection position falls in the third quadrant ZONE3 of FIG. 2. Correction at the time of projection from another quadrant can be carried out by substantially the same concept and method. At this time, an explanation will be given of the case of also performing correction for eliminating distortion of a projected image on a screen by image conversion processing when a video signal having a resolution of VGA (640 pixels×480 lines) is input as the input signal, this is converted in resolution to SVGA (800 pixels×600 lines), and this is projected from an oblique direction.

FIG. 9A shows the positional relationship between the projector 1 and the screen 101 in a right hand coordinate system of the case of front projection. Further, a yz plan view corresponding to that is shown in FIG. 9B, while an xy plan view is shown in FIG. 9C. At this time, the positional coordinates of the projector are expressed by (Px, Py, Pz), and the positional coordinates of the any point on the screen 101 are expressed by (Sx, Sy, Sz). The distance between the screen 101 and the projector 1 determined by the positional coordinates (Px, Py, Pz) and (Sx, Sy, Sz), and the oblique projection angles α and β are the relative relationship data mentioned above.

As shown in FIG. 9B and FIG. 9C, in front projection, the screen surface and the optical axis intersect perpendicularly. However, the optical axis intersects with the screen surface not at the center of the screen, but at a position closer to the bottom, i.e., here, near the center of the bottom side of the screen. This is because where a front projector is arranged on a desk or arranged so as to be suspended from a ceiling, the two are arranged so that the line connecting the center of the lens and the center of the screen does not become parallel to the ground. This is the specification designed so as not to project the bottom end part of the image to be projected onto the desk when the projector is placed on the desk and projected and referred to as "optical offset".

FIG. 10A shows the positional relationship between the projector and the screen in a right hand coordinate system where the image is projected obliquely upward with an angle by α degrees in the vertical direction and by β degrees with respect to the screen from the left in the horizontal direction. Further, FIG. 10B shows a yz plan view, and FIG. 10C shows an xy plan view. At this time, the rotation angle of the right hand coordinate system becomes α degrees in the vertical direction and (−β) degrees in the horizontal direction.

Here, the change of the relative viewpoint for facilitating understanding of the keystone distortion correction will be considered. In FIG. 10A to FIG. 10C, the image was projected from an oblique direction by moving the position of the projector 1, but here it is assumed that the screen 101 is axially rotated at that position without moving the projector 1 while maintaining the relative positional relationship.

Figure 11A:
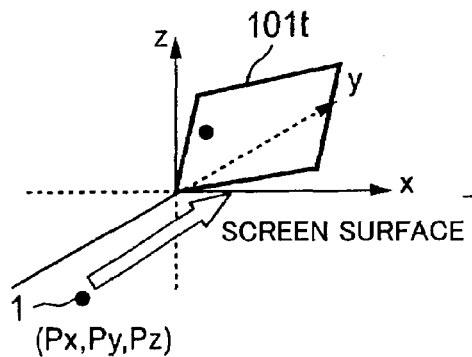
FIG. 11A to FIG. 11C are views of positional relationships of oblique projection equivalent to FIG. 10A to FIG. 10C where the screen is axially rotated.
Figure 11B:
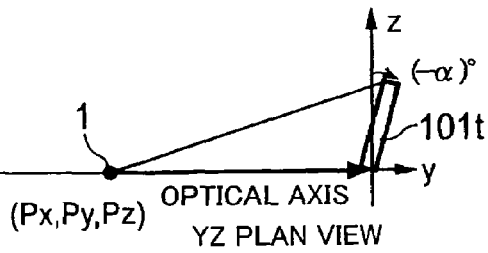
Figure 11C:
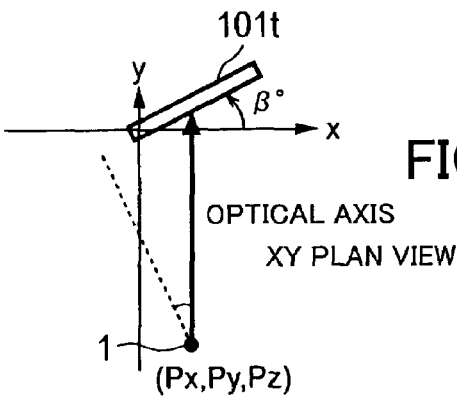

FIG. 11A to FIG. 11C show positional relationships of the oblique projection equivalent to FIG. 10A to FIG. 10C but where the screen is axially rotated. At this time, when expressed in a right hand coordinate system, the screen is inclined by (−α) degrees in the y-direction (back side) from the standing position centered around the bottom side thereof (x-axis) and rotated by β degrees in the counterclockwise direction centered around the left side (z-axis). That is, the inclinations and the angles of rotation shown in FIG. 11B and FIG. 11C have signs inverse with respect to the projection angles from the positions of arrangement of the projector shown in FIG. 10A to FIG. 10C.

Below, as shown in FIG. 11A to FIG. 11C, it will be considered how the projected video (projected image) is deformed when there is a projector 1 at the front position and the video is projected to the screen (below, described as 101t) inclined from this position.

The light projected by the projector 1 passes through the zx plane in which the screen 101 was located in FIG. 10A and is projected onto the inclined screen. The flat plane in which the inclined screen 101t is located is rotated by (−α) degrees in the vertical direction centered around the origin and rotated by β degrees horizontally, therefore can be expressed using a rotation matrix centered around the origin. In the present embodiment, there is rotation in the horizontal direction and the vertical direction, therefore the rotation matrix is defined by the procedure of first rotation in the horizontal direction, then rotation in the vertical direction. Specifically, a normal vector (nx, ny, nz) on the zx plane is expressed by the following matrix formula (2) by rotation:

$$\begin{pmatrix} nx \\ ny \\ nz \end{pmatrix} = \begin{pmatrix} 1 & 0 & 0 \\ 0 & \cos(-\alpha) & -\sin(-\alpha) \\ 0 & \sin(-\alpha) & \cos(-\alpha) \end{pmatrix} \begin{pmatrix} \cos\beta & -\sin\beta & 0 \\ \sin\beta & \cos\beta & 0 \\ 0 & 0 & 1 \end{pmatrix} \begin{pmatrix} 0 \\ 1 \\ 0 \end{pmatrix} \quad (2)$$

When considering a straight line connecting the position of the projector 1 and the point on the zx plane where the screen 101 is located and finding the intersecting point between this straight line and a plane having the normal vector of the matrix formula (1), the coordinate point projected on the plane of the inclined screen 101t is found. When viewing this inclined coordinate point focusing at the front of the screen as shown in FIG. 10A, it is sufficient to rotate by α degrees in the vertical direction and (−β) degrees in the horizontal direction centered about the origin as the rotation in the opposite direction again. Then, the shape of distortion where the image is projected from the oblique direction is found. The coordinates in the x-direction, the y-direction, and the z-direction derived by such a method are shown in equations (3-1), (3-2), and (3-3).

$$Kx = \frac{(Sx \cdot Pz - Sz \cdot Px) \cdot \sin\alpha + (Sy \cdot Px - Sx \cdot Py) \cdot \cos\alpha}{(Sx - Px) \cdot \sin(-\beta) + (Sy - Py) \cdot \cos\alpha \cdot \cos(-\beta) - (Sz - Pz) \cdot \sin\alpha \cdot \cos(-\beta)} \quad (3\text{-}1)$$

$$Ky = 0 \quad (3\text{-}2)$$

$$Kz = \frac{(Sx \cdot Py - Sy \cdot Px) \cdot \sin\alpha \cdot \sin(-\beta) + (Sx \cdot Pz - Sz \cdot Px) \cdot \cos\alpha \cdot \sin(-\beta) + (Sy \cdot Pz - Sz \cdot Py) \cdot \cos(-\beta)}{(Sx - Px) \cdot \sin(-\beta) + (Sy - Py) \cdot \cos\alpha \cdot \cos(-\beta) - (Sz - Pz) \cdot \sin\alpha \cdot \cos(-\beta)} \quad (3\text{-}3)$$

The (Kx, Ky, Kz) represented by these equations are coordinates deformed by keystone distortion when projecting an image by orienting the projector 1 upward by α degrees vertically as shown in FIG. 10B and at an angle of (−β) degrees from the left with respect to the screen 101 in the horizontal direction as shown in FIG. 10C.

Figure 12A:
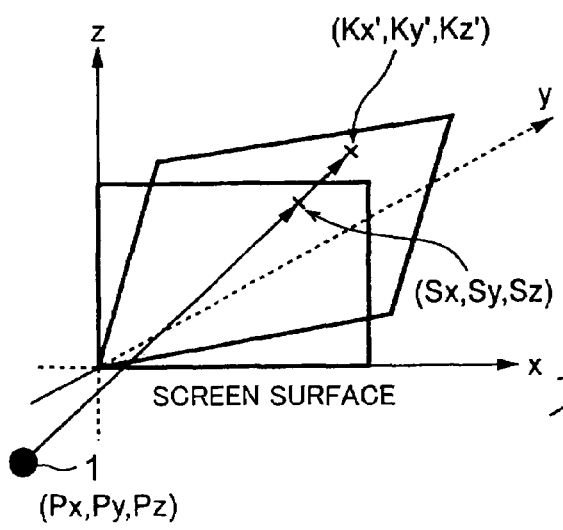
FIG. 12A and FIG. 12B are views of coordinate relationships together.
Figure 12B:
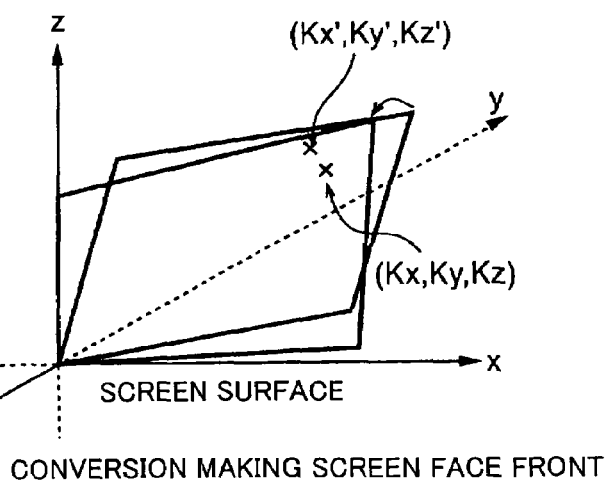

FIG. 12A and FIG. 12B show the coordinate relationships all together. In these diagrams, (Sx, Sy, Sz) are the coordinates of the screen and correspond to the coordinates of the original image projected on the screen to the regular square shape in the case of front projection. Further, the coordinates (Kx=, Ky=, Kz=) are the coordinates projected on the plane of the screen 101t obliquely inclined as in FIG. 11B and FIG. 11C. As explained above, (Kx, Ky, Kz) are coordinates deformed due to the keystone distortion.

In this way,the above three equations (3-1), (3-2), and (3-3) give deformed coordinates resulting from keystone distortion caused by projection from any direction.

Next, the deformed coordinates resulting from equations (3-1), (3-2), and (3-3) of the coordinates matched with the resolution of the output signal (video) to the LCD panel 3 serving as the display means are found. That is, in the case of SVGA output, the x-coordinate Sx of the image before the distortion changes from 0 to 799, and the z-coordinate Sz changes from 0 to 599. The x-coordinate Kx and the z-coordinate Kz after the keystone distortion at this time are found. Note that the y-coordinates Sy and Ky are zero since the image is located in the zx plane.

Figure 13A:
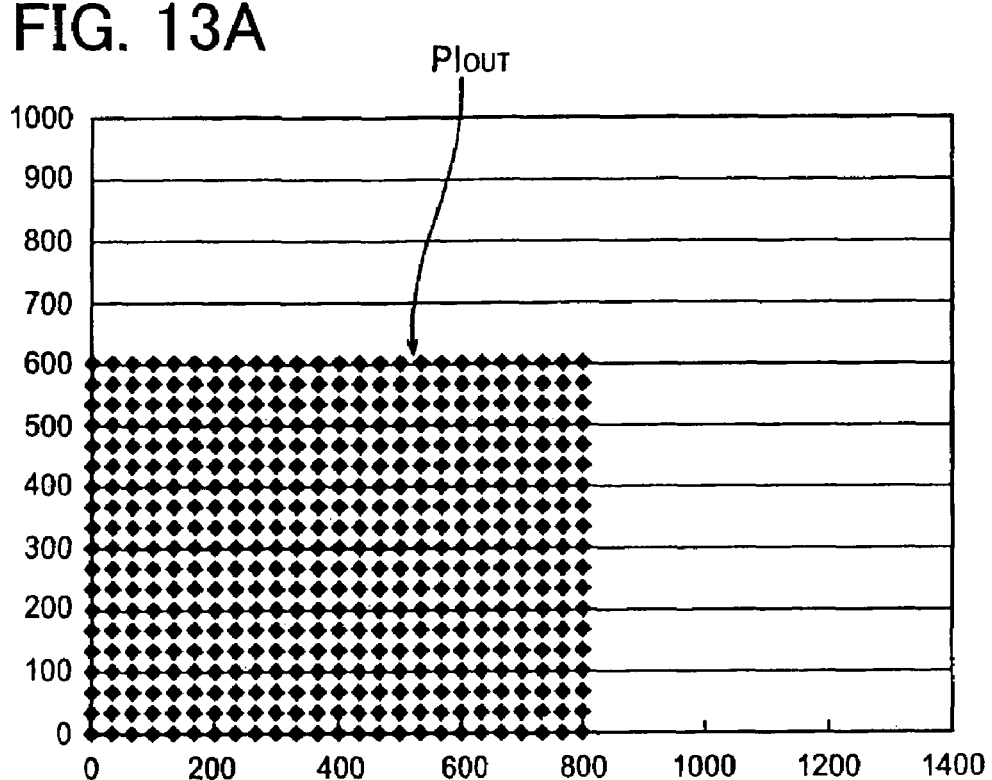
FIG. 13A is a view of an image of an address map of an SVGA output image of the front projection.
Figure 13B:
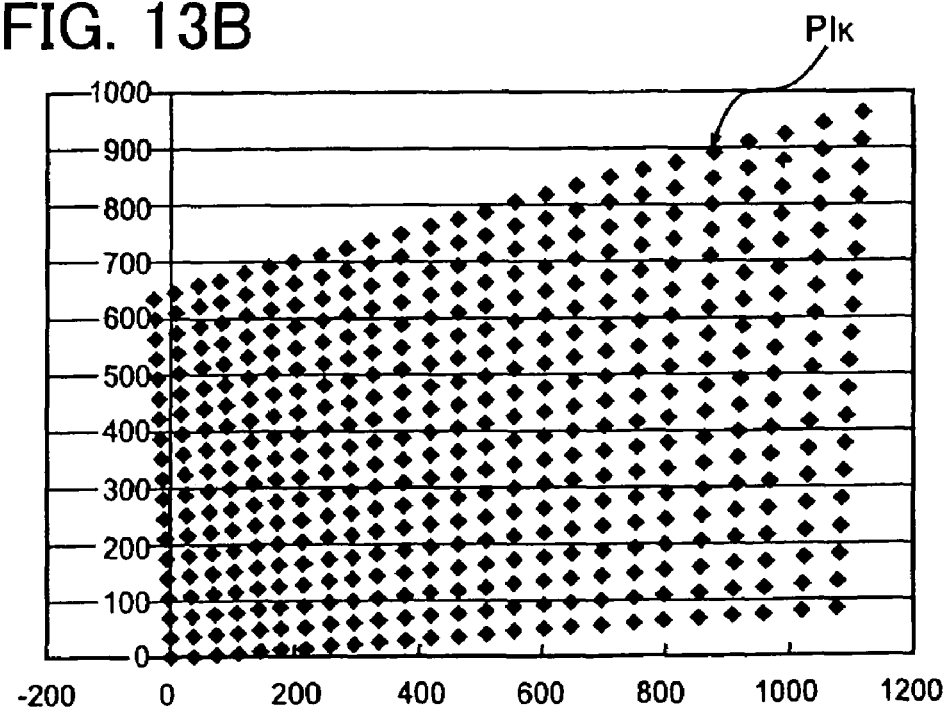
FIG. 13B is a view of a distorted image resulting from keystone deformation.

FIG. 13A shows an image $PI_{OUT}$ of the address map of the SVGA output image of front projection, and FIG. 13B shows an image (below, distorted image) $PI_K$ of the address map of the SVGA output image after the keystone deformation converted in coordinates while defining α=10 and −β=−30. In these diagrams, in order to avoid complexity of the illustration, sampling points of all of the pixel positions are not shown. The sampling points are represented by one dot for every 33 pixels. Addresses of these sampling points can be calculated at the CPU 2a when necessary or addresses calculated in advance can be provided as a reference table in the ROM 255. In the latter case, the ROM 255 corresponds to the relative relationship getting means 6 shown in FIG. 1.

Figure 14A:
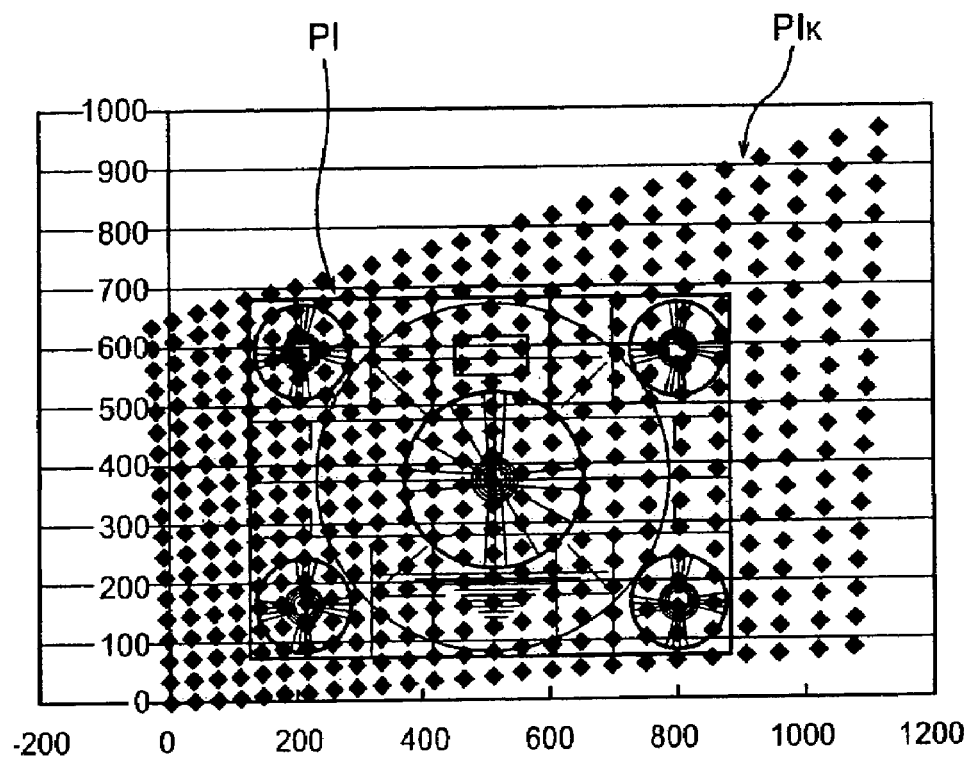
FIG. 14A is a view obtained by superimposing two images at the time of the mapping.

Next, as shown in FIG. 14A, the image PI of the video to be obtained by the correction (virtual image of the projected image to be realized on the screen, below referred to as a "projected image") is superimposed on the coordinate space deformed due to the distortion shown in FIG. 13B. Due to this, the projected image PI is mapped on the distorted image $PI_K$ and the correspondences of the addresses of the two images are determined. At this time, the input original image is VGA, but to adjust the size and position of the image, the projected image PI can be arranged with any size (for example, size of SVGA) and at any position in the deformed address space (distorted image $PI_K$). Note that if the projected image PI is not completely contained in the distorted image $PI_K$, after interpolation, part of the image will be missing. Accordingly, desirably it is required that the size of a projected image having the desired aspect ratio (4:3 in the present example) become the maximum limit in the address space of the distorted image. Then, the position and the size of this projected image PI devolve to a simple graphic issue. For example, with the position and the size as in FIG. 14A, the relationship between the projected image PI and the distorted image $PI_K$ is uniquely determined.

In such mapping (linking addresses), the address distribution of the distorted image $PI_K$ is already found from the above equations (3-1), (3-2), and (3-3). Therefore, even if an actual physical memory (storage resources) is not used, for example the mapping can be executed assuming a virtual memory space in the CPU 2a. For this reason, the mapping itself becomes high speed and there is no transfer of data with a physical memory, therefore even if redone several times, the ratio of the total time of the processing in the entire time of the image conversion is extremely small.

The correspondence of the addresses obtained by the mapping is address correspondence between the distorted image and the desired projected image which becomes a regular square on the screen without distortion, but the distorted image is a result of projection of the image on the LCD panel of a regular square originally without distortion. Accordingly, by utilizing the above correspondence of addresses, the image of the LCD panel 3 for obtaining the projected image on the screen without distortion can be generated.

In more detail, in the case of SVGA output, the number of the coordinates of the effective display region of the LCD panel 3 becomes 800×600. For all of these points, the interpolation is carried out at the mapped addresses of the image. Among the interpolations at the 800×600 points at this time, in the interpolations at all addresses of the region in which the distorted image. $PI_K$ and the projected image PI overlap shown in FIG. 14A, the filter coefficients are selected so as to be able to reproduce the image data like the projected image, and a plurality of pixel data of the original image required for the reproduction of the image are weighted by the filter coefficients to form new pixel data. The formed pixel data are allocated to the addresses uniquely determining the arrangement position in the SVGA screen as a regular square screen having an aspect ratio of 4:3 based on the above address correspondence found by mapping. On the other hand, in the interpolation of the region in the distorted image $PI_K$ at the periphery of the projected image PI shown in FIG. 14A, the result becomes combination of black colored pixels having no image data, therefore black colored image data is allocated to the corresponding positions in the SVGA screen even after interpolation.

Figure 14B:
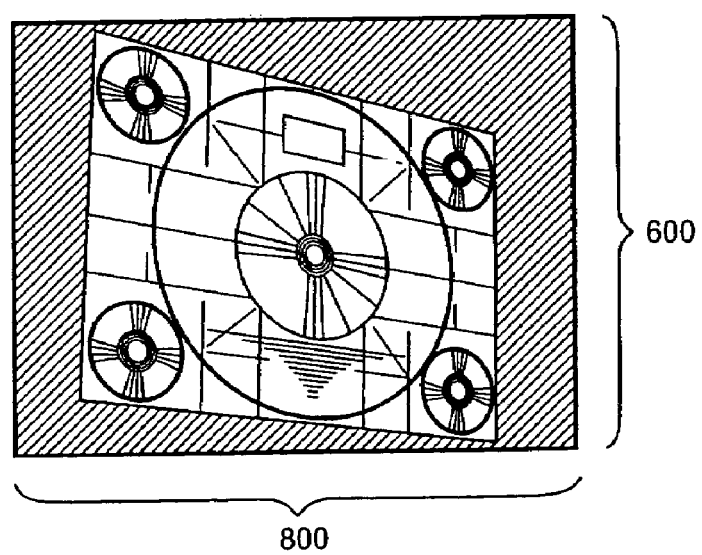
FIG. 14B is a display screen of a LCD panel generated by an interpolation operation.

FIG. 14B shows an SVGA output image generated by such an image conversion procedure. This image is an image after keystone distortion correction. When displaying this image on the LCD panel as in FIG. 4C and projecting it as in FIG. 4A, a regular square projected image is obtained on the screen. The correspondences of addresses obtained by the mapping are determined so that the area in which the image sizes overlap becomes the maximum as mentioned above, therefore, in the projected image on the screen, the drops in brightness and resolution are suppressed to a minimum.

In the above explanation of FIG. 13A and FIG. 13B, the output image $PI_{OUT}$ was given by 600×800 addresses matching with the size of the output image (SVGAn image), this was deformed, and the distorted image $PI_K$ was generated. Then, as shown in FIG. 14A, a procedure of superimposing the projected image PI on the distorted image while changing the size and the position of the projected image PI and finding the address correspondence required for the distortion correction from the two images after superimposition was employed. An address correspondence the same as this can be found also by the following technique.

In FIG. 14A, the output image $PI_{OUT}$ is given by 64×480 addresses the same as the original image (VGAn image) and is deformed to generate the distorted image $PI_K$. In FIG. 14A, the size of the distorted image $PI_K$ is changed, while the size of the projected image PI is not changed as it corresponds to the SVGA from the first. Only the position thereof is changed for the optimum superimposition of the two images. By this technique as well, the result becomes the same as that of FIG. 14A.

While distortion correction at the time of projection from the bottom left position (third quadrant ZONE3) toward the screen was explained above, in the case of projection from another position, only the equations for finding the distortion coordinates are different. The procedure of the correction method explained above is the same.

Figures 1, 15A:
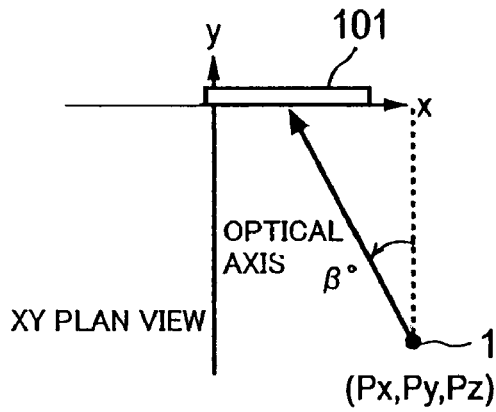
Figures 1, 15B:
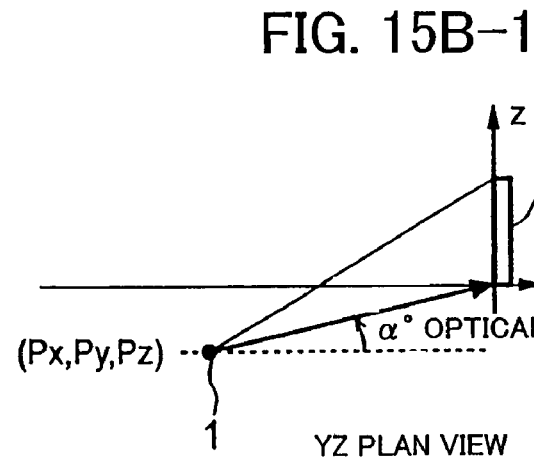
Figures 2, 15A:
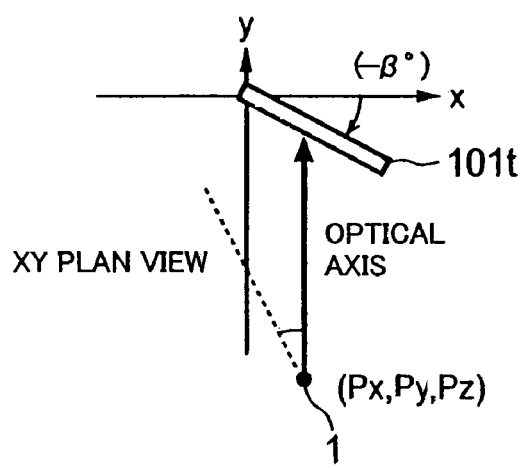
Figures 2, 15B:
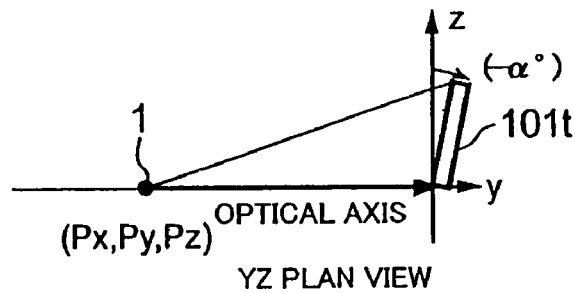

FIG. 15A-1 and FIG. 15B-1 are an xy plan view and a yz plan view of a right hand coordinate system at the time of projection from the bottom right position (fourth quadrant ZONE4) toward the screen 101. When assuming that the projection position of the projector 1 is not moved from front projection, the xy plan view and the yz plan view in the case where the screen 101 is axially rotated so that the same relative relationship is obtained are shown in FIG. 15A-2 and FIG. 15B-2. At this time, the rotation angle of the right hand coordinate system becomes $(-\alpha)$ degrees in the vertical direction and $(-\beta)$ degrees in the horizontal direction.

The equations for finding the keystone distortion coordinates projected on the inclined screen 101t are shown in equations (4-1), (4-2), and (4-3):

$$Kx = \frac{(Sx \cdot Pz - Sz \cdot Px) \cdot \sin\alpha + (Sy \cdot Px - Sx \cdot Py) \cdot \cos\alpha}{(Sx - Px) \cdot \sin\beta + (Sy - Py) \cdot \cos\alpha \cdot \cos\beta - (Sz - Pz) \cdot \sin\alpha \cdot \cos\beta} \quad (4-1)$$

$$Ky = 0 \quad (4-2)$$

$$Kz = \frac{(Sz \cdot Py - Sy \cdot Px)\sin\alpha \cdot \sin\beta + (Sz \cdot Pz - Sz \cdot Pz) \cdot \cos\alpha \cdot \sin\beta + (Sy \cdot Pz - Sz \cdot Py) \cdot \cos\beta}{(Sx - Px) \cdot \sin\beta + (Sy - Py) \cdot \cos\alpha \cdot \cos\beta - (Sz - Pz) \cdot \sin\alpha \cdot \cos\beta} \quad (4-3)$$

FIG. 16A-1 and FIG. 16B-1 are an xy plan view and a yz plan view of a right hand coordinate system at the time of projection from the top left position (second quadrant ZONE2) toward the screen 101. Further, when the projection position of the projector 1 is not moved from the front projection, the xy plan view and the yz plan view in the case where the screen 101 is axially rotated so that the same relative relationship is obtained are shown in FIG. 16A-2 and FIG. 16B-2. At this time, the rotation angle of the right hand coordinate system becomes $\alpha$ degrees in the vertical direction and becomes $\beta$ degrees in the horizontal direction.

The equations for finding the keystone distortion coordinates projected on the inclined screen 101t are shown in equations (5-1), (5-2), and (5-3).

$$Kx = \frac{(Sx \cdot Pz - Sz \cdot Px) \cdot \sin(-\alpha) + (Sy \cdot Px - Sx \cdot Py) \cdot \cos(-\alpha)}{(Sx - Px) \cdot \sin(-\beta) + (Sy - Py) \cdot \cos(-\alpha) \cdot \cos(-\beta) - (Sz - Pz) \cdot \sin(-\alpha) \cdot \cos(-\beta)} \quad (5-1)$$

$$Ky = 0 \quad (5-2)$$

$$Kz = \frac{(Sx \cdot Py - Sy \cdot Px) \cdot \sin(-\alpha) \cdot \sin(-\beta) + (Sx \cdot Pz - Sz \cdot Px)\cos(-\alpha) \cdot \sin(-\beta) + (Sy \cdot Pz - Sz \cdot Py) \cdot \cos(-\beta)}{(Sx - Px) \cdot \sin(-\beta) + (Sy - Py) \cdot \cos(-\alpha) \cdot \cos(-\beta) - (Sz - Pz) \cdot \sin(-\alpha) \cdot \cos(-\beta)} \quad (5-3)$$

Figures 1, 17A:
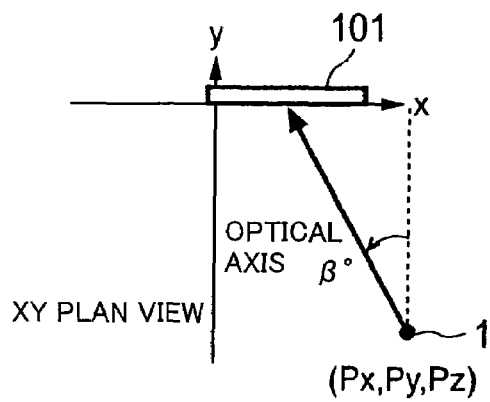
Figures 1, 17B:
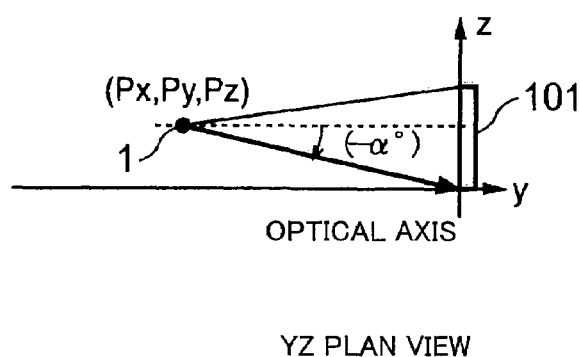
Figures 2, 17A:
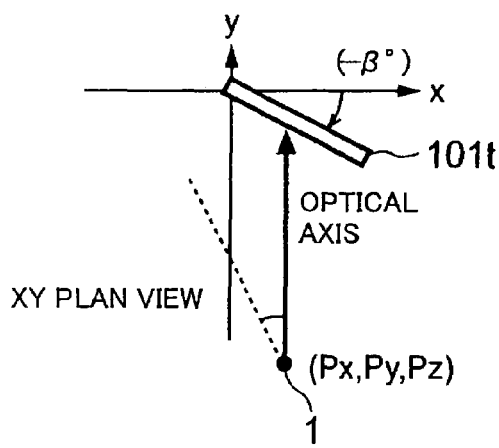
Figures 2, 17B:
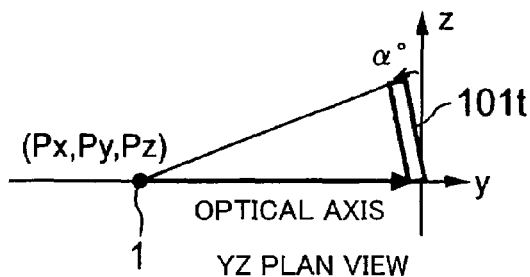

FIG. 17A-1 and FIG. 17B-1 are an xy plan view and yz plan view of a right hand coordinate system at the time of projection from the top right position (first quadrant ZONE1) toward the screen 101. Further, when the projection position of the projector 1 is not moved from front projection, the xy plan view and the yz plan view in the case where the screen 101 is axially rotated so that the same relative relationship is obtained are shown in FIG. 17A-2 and FIG. 17B-2. At this time, the rotation angle of the right hand coordinate system becomes $\alpha$ degrees in the vertical direction and $(-\beta)$ degrees in the horizontal direction.

The equations for finding the keystone distortion coordinates projected on the inclined screen 101t are shown in equations (5-1), (5-2), and (5-3).

$$Kx = \frac{(Sx \cdot Pz - Sz \cdot Px) \cdot \sin(-\alpha) + (Sy \cdot Px - Sx \cdot Py) \cdot \cos(-\alpha)}{(Sx - Px) \cdot \sin\beta + (Sy - Py) \cdot \cos(-\alpha) \cdot \cos\beta - (Sz - Pz) \cdot \sin(-\alpha) \cdot \cos\beta} \quad (6-1)$$

$$Ky = 0 \quad (6-2)$$

$$Kz = \frac{(Sx \cdot Py - Sy \cdot Px) \cdot \sin(-\alpha) \cdot \sin\beta + (Sx \cdot Pz - Sz \cdot Px)\cos(-\alpha) \cdot \sin\beta + (Sy \cdot Pz - Sz \cdot Py) \cdot \cos\beta}{(Sx - Px) \cdot \sin\beta + (Sy - Py) \cdot \cos(-\alpha) \cdot \cos\beta - (Sz - Pz) \cdot \sin(-\alpha) \cdot \cos\beta} \quad (6-3)$$

Next, a detailed explanation will be given of the interpolation operation in the present embodiment.

Figure 18:
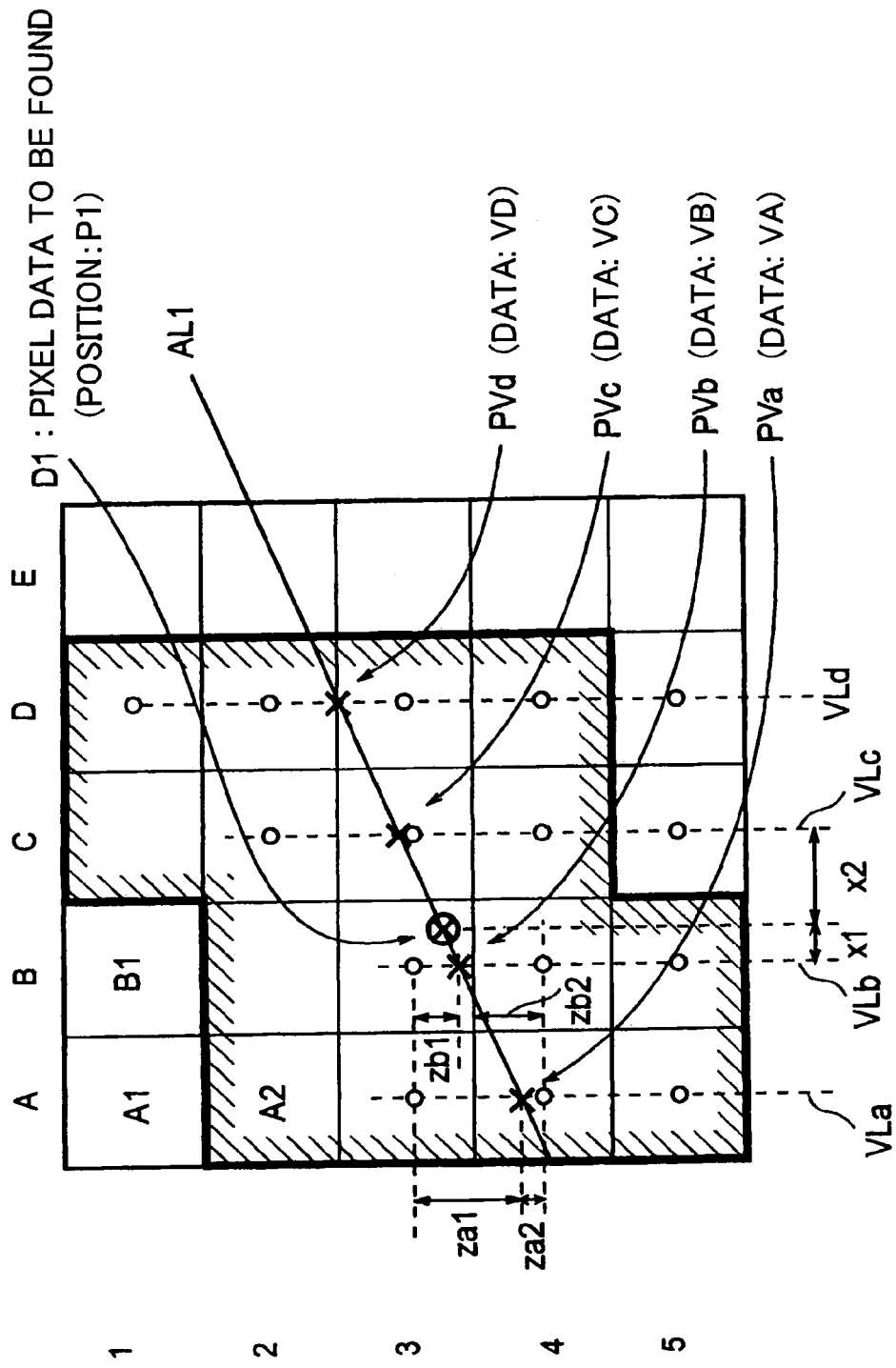
FIG. 18 is a view obtained by superimposing address lines of the keystone distorted image on the original image.

FIG. 18 is a diagram superimposing the line connecting oblique address points corresponding to a horizontal line among the addresses composing deformed coordinates resulting from keystone distortion on the original image.

For convenience, as shown in FIG. 18, letters A, B, and C are attached in the horizontal direction, numbers 1, 2, and 3 are attached in the vertical direction, and the original pixel data are indicated by the combination of the horizontal and vertical positions at this time. For example, in FIG. 18, the original pixel data at the top left end is represented as "A1". Now assume that the position of the pixel to be interpolated is the position of the original pixel data of "B3".

Below, an explanation will be given of the case of performing an interpolation operation (first interpolation operation) on pixel data in the vertical direction several times and performing an interpolation operation (second interpolation operation) in the horizontal direction for several interpolated data resulting from this.

In the present embodiment, whenever generating one new pixel data D1 by an interpolation operation, the combination of the original pixel data used is selected. The selection is carried out based the intersecting points between the oblique address line AL1 and the vertical lines VLa, VLb, VLc, and VLd connecting the original pixels in the vertical direction. Each of the vertical lines VLa, VLb, VLc, and VLd is a line connecting a constant position of the original pixel determined in advance, for example, the pixel center. In FIG. 18, a pixel center is represented by a white circle. The intersecting point of the address line AL1 and the vertical line VLa is defined by Pva. In the same way, the intersecting point of the address line AL1 and the vertical line VLb is defined by Pvb, the intersecting point of the address line AL1 and the vertical line VLc is defined by Pvc, and the intersecting point of the address line AL1 and the vertical line VLd is defined by Pvd.

The intersecting point PVa lies between the center of the original pixel data A3 and the center of the original pixel data A4, therefore the original pixel data A2, A3, A4, and A5 are selected based on the intersecting point PVa. In the same way as above, the original pixel data B2, B3, B4, and B5 are selected in the B column, the original pixel data C1, C2, C3, and C4 are selected in the C column, and the original pixel data D1, D2, D3, and D4 are selected in the D column.

The original pixel data is selected by the CPU 2*a* shown in FIG. 6. The selected base pixel data are sequentially input to the vertical direction interpolation filter 11 of FIG. 8.

In the vertical direction interpolation filter 11, the first interpolation operation is sequentially executed. The first interpolation operation in the present example is a four-tap convolution operation. Accordingly, the vertical direction interpolated data Va, Vb, Vc, and Vd at the intersecting points PVa, PVb, PVc, and PVd are calculated by using the computation equations shown in equations (7-1), (7-2), (7-3), and (7-4).

$$Va = A2 \times h\left(-1 - \frac{za1}{za1+za2}\right) + A3 \times h\left(-\frac{za1}{za1+za2}\right) + \qquad (7\text{-}1)$$
$$A4 \times h\left(\frac{za2}{za1+za2}\right) + A5 \times h\left(1 + \frac{za2}{za1+za2}\right)$$

$$Vb = B2 \times h\left(-1 - \frac{zb1}{zb1+zb2}\right) + B3 \times h\left(-\frac{zb1}{zb1+zb2}\right) + \qquad (7\text{-}2)$$
$$B4 \times h\left(\frac{zb2}{zb1+zb2}\right) + B5 \times h\left(1 + \frac{zb2}{zb1+zb2}\right)$$

$$Vc = C1 \times h\left(-1 - \frac{zc1}{zc1+zc2}\right) + C2 \times h\left(-\frac{zc1}{zc1+zc2}\right) + \qquad (7\text{-}3)$$
$$C3 \times h\left(\frac{zc2}{zc1+zc2}\right) + C4 \times h\left(1 + \frac{zc2}{zc1+zc2}\right)$$

$$Vd = D1 \times h\left(-1 - \frac{zd1}{zd1+zd2}\right) + D2 \times h\left(-\frac{zd1}{zd1+zd2}\right) + \qquad (7\text{-}4)$$
$$D3 \times h\left(\frac{zd2}{zd1+zd2}\right) + D5 \times h\left(1 + \frac{zd2}{zd1+zd2}\right)$$

Here, ineEquation (7-1), the phase difference $za1$ is the phase difference between the original pixel center of the data A3 and the intersecting point PVa, while the phase difference $za2$ is the phase difference between the original pixel center of the data A4 and the intersecting point PVa. In the same way, in equation (7-2), the phase difference $zb1$ is the phase difference between the original pixel center of the data B3 and the intersecting point PVb, and the phase difference $zb2$ is the phase difference between the original pixel center of the data B4 and the intersecting point PVb. These phase differences are shown in FIG. 18. Also, the phase differences $zc1$, $zc2$, $zd1$, and $zd2$ between the other intersecting points PVc and PVd and the centers of two pixels nearest in the vertical direction are defined in the same way as above. Based on these phase differences, the vertical direction set of filter coefficients is generated by the coefficient generation unit 257 shown in FIG. 7. Note that it is also possible to generate the vertical direction set of filter coefficients in advance and hold it in the ROM 255 etc.

Due to this, the vertical direction interpolated data Va, Vb, Vc, and Vd are generated at the positions of the intersecting points PVa, PVb, PVc, and PVd. The vertical direction interpolated data Va, Vb, Vc, and Vd are stored at predetermined addresses of the first register 13*a* while being switched by the selector 14 shown in FIG. 8.

Next, the interpolated data Va, Vb, Vc, and Vd pass through the selector 15 and are supplied to the horizontal direction interpolation filter 12. The horizontal direction interpolation filter 12 executes a horizontal direction interpolation operation (second interpolation operation) on the interpolated data Va, Vb, Vc, and Vd.

In the second interpolation operation, the phase difference between the two vertical lines VLb and VLc nearest in the horizontal direction and the interpolation position P1 are defined by x1 and x2. At this time, the pixel data D1 generated by the horizontal interpolation at the interpolation position P1 is calculated by the four-tap interpolation operation shown in equation (8).

$$D1 = Va \times h\left(-1 - \frac{x1}{x1+x2}\right) + Vb \times h\left(-\frac{x1}{x1+x2}\right) + \qquad (8)$$
$$Vc \times h\left(\frac{x2}{x1+x2}\right) + Vb \times h\left(1 + \frac{x2}{x1+x2}\right)$$

Note that, the horizontal direction set of filter coefficients is generated at the coefficient generation unit 257 based on the phase differences x1 and x2 and supplied from the coefficient generation unit 257 to the horizontal direction interpolation filter 12 directly or after passing through the ROM 255 etc.

As described above, new pixel data D1 was generated at the interpolation position P1 by the plurality of (four in the present example) first interpolation operations and one second interpolation operation. In the same way as the above, pixel data D2 is generated at the next interpolation position P2.

Figure 19:
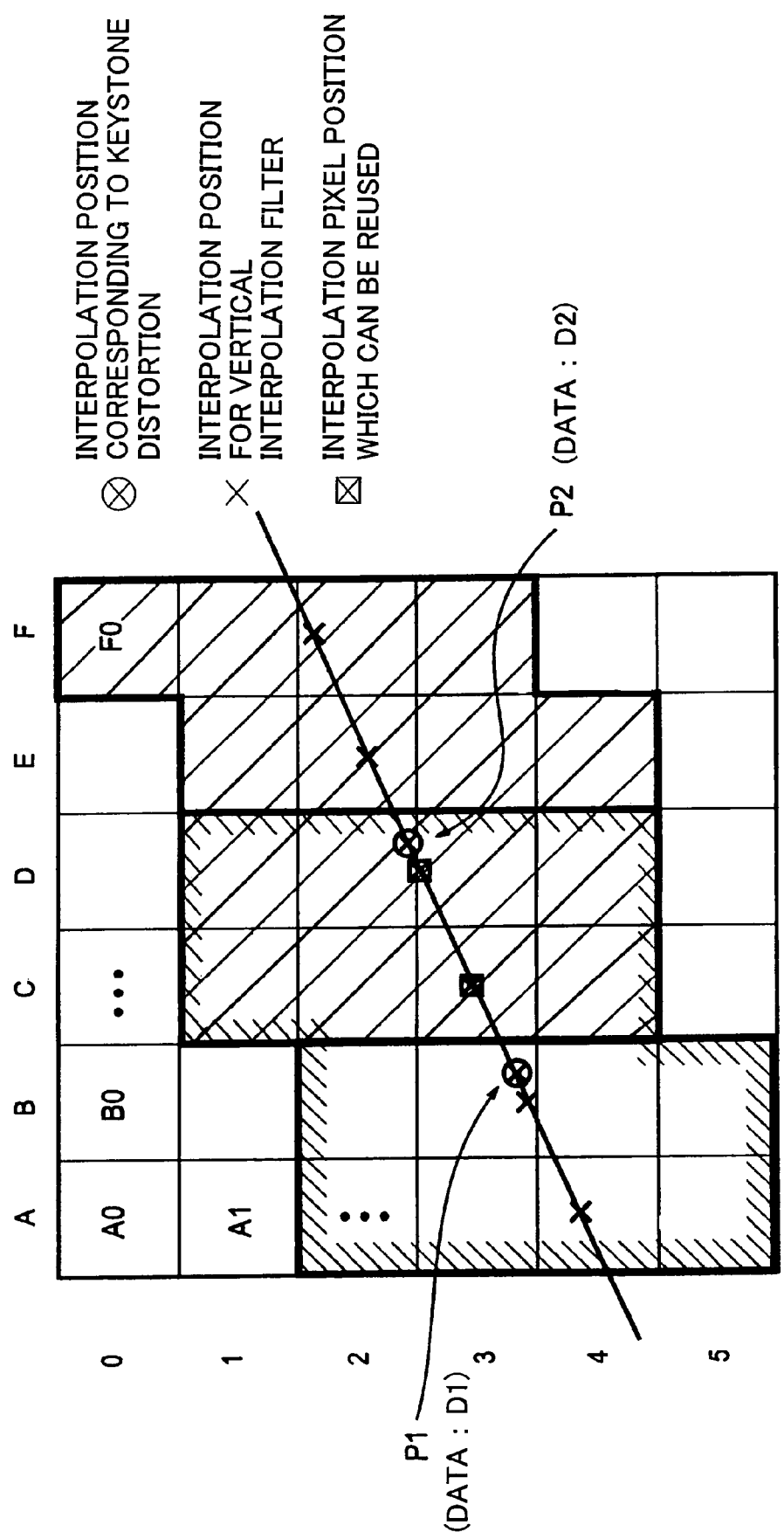
FIG. 19 is an explanatory view of a case of generating two pixel data.

FIG. 19 shows the relationship between the address line and the original image when generating pixel data at the position P2 after the position P1.

When generating data at the position P2 by interpolation processing, from the periphery thereof, four bits of data in four columns, i.e., 16 bits of original image data in total, are selected. In the same way as the case of generating the position P1, the original image data is selected using the intersecting points between the oblique address line AL1 and the vertical direction lines of the four columns as the reference. For example, when selecting the set of the original pixel data so that two pixel centers are located at one side and the other side of each intersecting point in the vertical direction, in the example shown in FIG. 19, the original pixel data of row numbers 1 to 4 are selected up to the C column, the D column, and the E column, but the original pixel data of row numbers 0 to 3 are selected in the F column. At this time, the original pixel data of the C column and the D column, that is, the set of the original pixel data (C1, C2, C3, C4) and the set of the original pixel data (D1, D2, D3, D4), are the same as those when calculating the pixel data the previous time. Accordingly, reuse of the first interpolation operation result (interpolated data Vc, Vd) using the set of the same original pixel data is possible.

In FIG. 8, the interpolated data Va=, Vb=, Vc=, and Vd= stored in the second register 13*b* are the interpolated data used for the calculation of the pixel data D1 the previous time. These data were stored in the first register 13*a* first, but are transferred to the second register at a predetermined timing. During the period from the start of the horizontal interpolation operation for generating the pixel data D1 the previous time to the end of the vertical interpolation operation for generating the pixel data D2 this time, the held content of the second register 13*b* is shifted to the left side in FIG. 8 by exactly the required amount. In the example of FIG. 19, the interpolated data Vc' and Vd' corresponding to the C column and the D column are shifted to the position of the interpolated data Va' and Vb' in FIG. 8.

Figure 20:
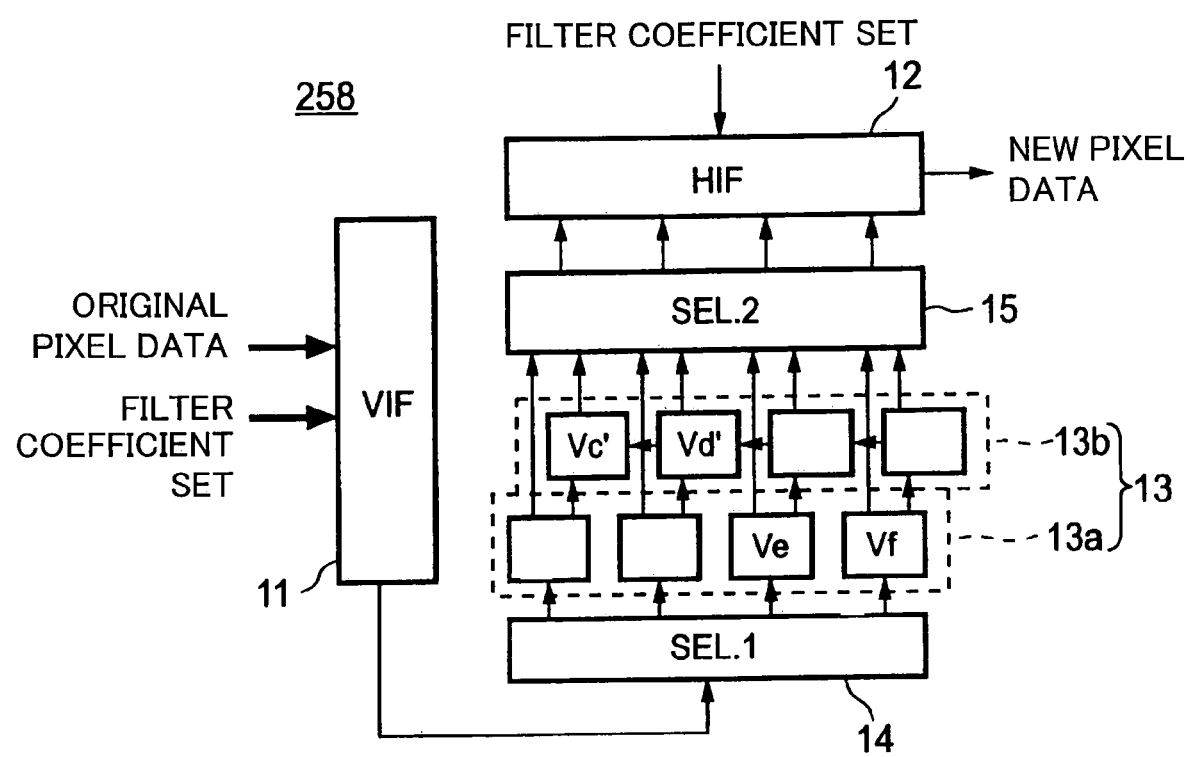
FIG. 20 is a block diagram of a filter unit showing the content of a register after a data shift.

FIG. 20 is a block diagram of a filter unit showing the register content after this shift.

Originally, four interpolation operations in the vertical direction are executed for calculating new pixel data, but in the present embodiment, operations on interpolated data which can be reused are omitted. In more detail, under the control of the CPU 2a, the interpolation operations of the C column and the D column are omitted, and the interpolation operations of the E column and the F column are executed by the vertical direction interpolation filter 11. The interpolated data Ve and Vf obtained as a result are stored as illustrated in the first register 13a under the control of the selector 14.

Next, under the control of the selector 15, the interpolated data Vc' and Vd' corresponding to the C column and the D column are read from the second register 13b, and the interpolated data Ve and Vf corresponding to the E column and the F column are read from the first register 13a. When the horizontal direction interpolation filter 12 performs the second interpolation operation by using these interpolated data, the new pixel data D2 is generated at the position P2.

In the present embodiment, in the generation of the pixels of the second and subsequent times in this way, the first interpolation operation result used for the generation of the pixel data immediately before this can be reused. This becomes possible since the original pixel data used for the first interpolation operation is selected based on the intersecting points between the oblique address line and the vertical lines.

That is, in the usual method of uniformly deciding the range of the original pixel data as to for example 4×4 centered around the interpolation position, one new pixel data is indeed generated, but the vertical interpolation operation ends up being performed four times. Accordingly, even when there is almost no horizontal distortion component, the same computation is uselessly repeated in many cases. Further, even if trying to reuse the calculation result, if the range of the original pixel data is uniformly determined, no sets of overlapping original pixel data will be generated if there is even a little inclination of the address line and therefore reuse becomes substantially impossible.

In the present embodiment, the selection range of the original pixel data flexibly changes in accordance with the inclination of the address line, therefore a higher efficiency of the first interpolation operation having a computation time several times that of the second interpolation operation can be achieved. The reduction of the number of times of the computation of the first interpolation operation is directly connected to the improvement of the computation efficiency of the whole, therefore the efficiency of generation of the image for correcting distortion can be effectively improved.

Due to the above, the processing time can be reduced in the signal processing necessary when a projector projects an image from an oblique direction. Further, since the overlapped vertical direction interpolated data is not recomputed, the pixel data fetched from the memory necessary overlappingly in the vertical direction operation unit becomes unnecessary. For this reason, without greatly changing the interpolation technique, the load of the processing of the memory is reduced and the bit size of the memory may be made small.

Note that the number of pixels in the vertical direction and the number of pixels in the horizontal direction used for the interpolation operation are not limited to four and can be arbitrarily set. Further, it is also possible to change the method of the selection of the original image data in accordance with the inclination of the address line. For example, when the inclination of the address line AL1 shown in FIG. 18 is smaller, the pixel data of the same row number is selected from the A column to the C column, and the pixel data is selected within a range obtained by an upward shift by exactly the amount of one pixel for only the D column, while when the inclination of the address line AL1 is larger than that of the case of FIG. 18, it is possible to select the pixel data within a range obtained by shifting three columns of the B column to the D column upward by exactly the amount of one pixel with respect to the pixel data selected in the A column.

Second Embodiment

In the second embodiment, conversely to the first embodiment, the first interpolation operation is carried out in the horizontal direction, and the second interpolation operation is carried out in the vertical direction. As the filter unit, in FIG. 8, use can be made of one obtained by switching the positions of the vertical interpolation filter 11 and the horizontal interpolation filter 12.

Figure 21:
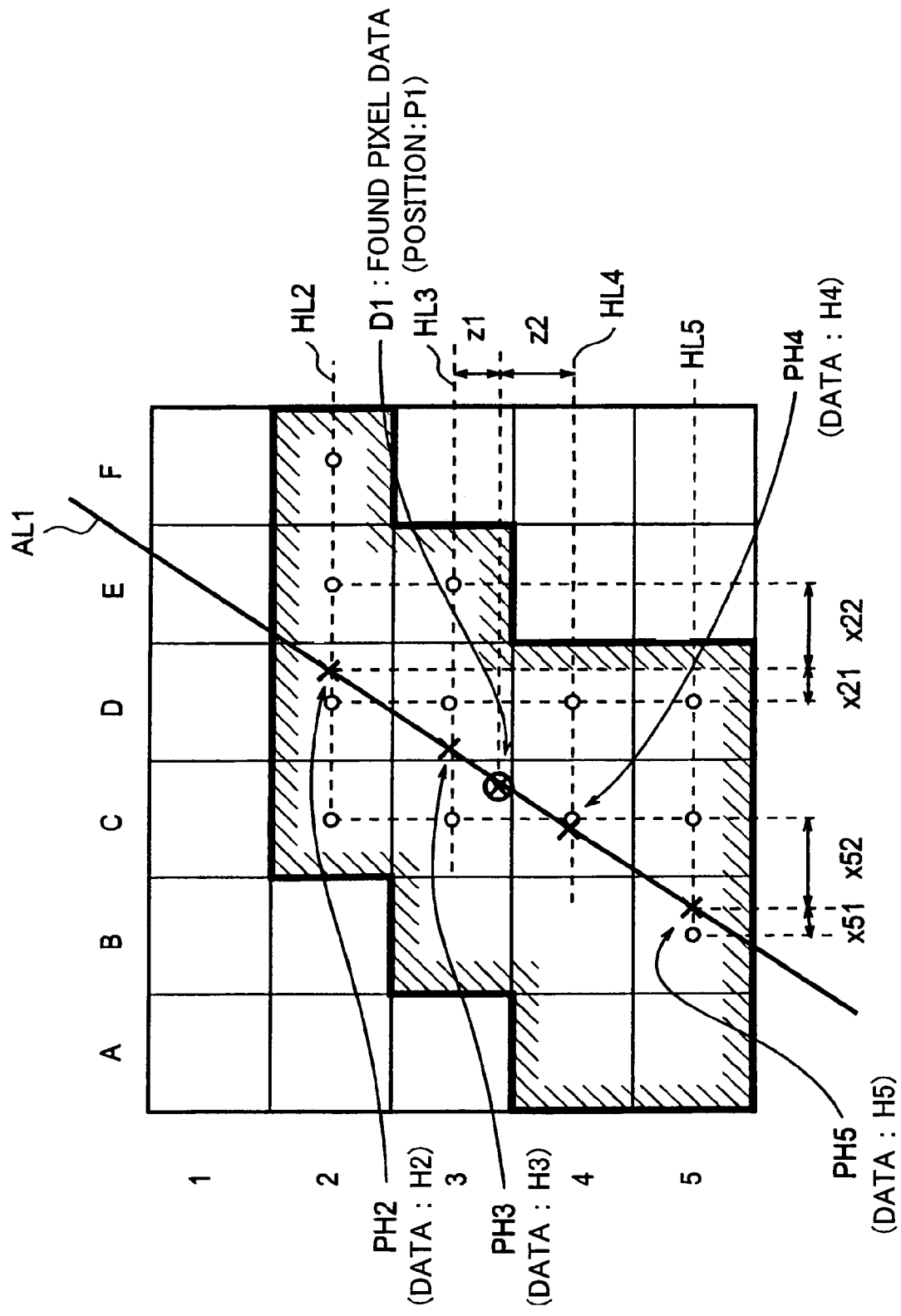
FIG. 21 is an explanatory view of the generation of image data by an interpolation method of a second embodiment of the present invention.

FIG. 21 shows the relationship between an address line and the original image when generating the pixel data D1 at the position P1 by the interpolation method of the second embodiment.

The address line AL1 of the image suffering from distortion overlaps the original image as illustrated. New pixel data is found at the point P1 on the address line. In this case, based on the intersecting points between the address line AL1 and the lines connecting constant positions determined in advance of the original image, for example, the centers of the pixels, that is, the horizontal lines HL2, HL3, HL4, and HL5, a set of a plurality of, i.e., four, original image data arranged in the horizontal direction is selected. When based on the intersecting point PH2, the set of the original image data (C2, D2, E2, F2) is selected. When based on the intersecting point PH3, the set of the original image data (B3, C3, D3, E3) is selected, when based on the intersecting point PH4, the set of the original image data (A4, B4, C4, D4) is selected, and when based on the intersecting point PH5, the set of the original image data (A5, B5, C5, D5) is selected.

The interpolated data H2, H3, H4, and H5 in the horizontal direction at the intersecting points PH2, PH3, PH4, and PH5 are calculated by using the computation equations shown in equations (9-1), (9-2), (9-3), and (9-4):

$$H2 = C2 \times h\left(-1 - \frac{x21}{x21 + x22}\right) + D2 \times h\left(-\frac{x21}{x21 + x22}\right) + \qquad (9\text{-}1)$$
$$E2 \times h\left(\frac{x22}{x21 + x22}\right) + F2 \times h\left(1 + \frac{x22}{x21 + x22}\right)$$

$$H3 = B3 \times h\left(-1 - \frac{x31}{x31 + x32}\right) + C3 \times h\left(-\frac{x31}{x31 + x32}\right) + \qquad (9\text{-}2)$$
$$D3 \times h\left(\frac{x32}{x31 + x32}\right) + E3 \times h\left(1 + \frac{x32}{x31 + x32}\right)$$

$$H4 = A4 \times h\left(-1 - \frac{x41}{x41 + x42}\right) + B4 \times h\left(-\frac{x41}{x41 + x42}\right) + \qquad (9\text{-}3)$$
$$C4 \times h\left(\frac{x42}{x41 + x42}\right) + D4 \times h\left(1 + \frac{x42}{x41 + x42}\right)$$

$$H5 = A5 \times h\left(-1 - \frac{x51}{x51 + x52}\right) + B5 \times h\left(-\frac{x51}{x51 + x52}\right) + \qquad (9\text{-}4)$$
$$C5 \times h\left(\frac{x52}{x51 + x52}\right) + D5 \times h\left(1 + \frac{x52}{x51 + x52}\right)$$

Here, in equation (9-1), the phase difference x21 is the phase difference between the original pixel center of the data D2 and the intersecting point PH2, while the phase difference x22 is the phase difference between the original pixel center of the data E2 and the intersecting point PH2. In the same way, in equation (9-4), the phase difference x51 is the phase difference between the original pixel center of the data B5 and the intersecting point PH5, while the phase difference x52 is the phase difference between the original pixel center of the data C5 and the intersecting point PH5. These phase differences are shown in FIG. 21. Also the phase differences x31, x32, x41, and x42 between the other intersecting points PH3 and PH4 and two original pixel centers nearest in the horizontal direction are defined in the same way as above.

Due to this, the interpolated data H2, H3, H4, and H5 in the horizontal direction are generated at the positions of the intersecting points PH2, PH3, PH4, and PH5.

The interpolated data H2, H3, H4, and H5 in the horizontal direction are held once in the first register 13a.

Thereafter, the vertical direction interpolation filter executes a vertical direction interpolation operation (second interpolation operation) on the interpolated data H2, H3, H4, and H5.

In the second interpolation operation, the phase differences between two horizontal lines HL3 and HL4 nearest in the vertical direction and the interpolation position P1 are defined as z1 and z2. At this time, the pixel data D1 generated by the vertical interpolation at the interpolation position P1 is calculated by the four-tap interpolation operation equation shown in equation (10).

$$D1 = H2 \times h\left(-1 - \frac{z1}{z1+z2}\right) + H3 \times h\left(-\frac{z1}{z1+z2}\right) + \\ H4 \times h\left(\frac{z2}{z1+z2}\right) + H5 \times h\left(1 + \frac{z2}{z1+z2}\right) \quad (10)$$

As described above, even if performing the horizontal direction interpolation operation first and performing the vertical direction interpolation operation on the results, the new pixel data D1 can be generated in the same way as above. Note that the generation of the subsequent pixel data and the control of the register at that time (reuse of the interpolated data) are carried out in the same way as the first embodiment.

Third Embodiment

In the above first and second embodiments, each time calculating one new pixel data, a plurality of first interpolation operation and second interpolation operation were repeated.

In the third embodiment, first all of the first interpolation operations corresponding to for example an address line are ended and then the second interpolation operations are repeatedly executed.

Figure 22:
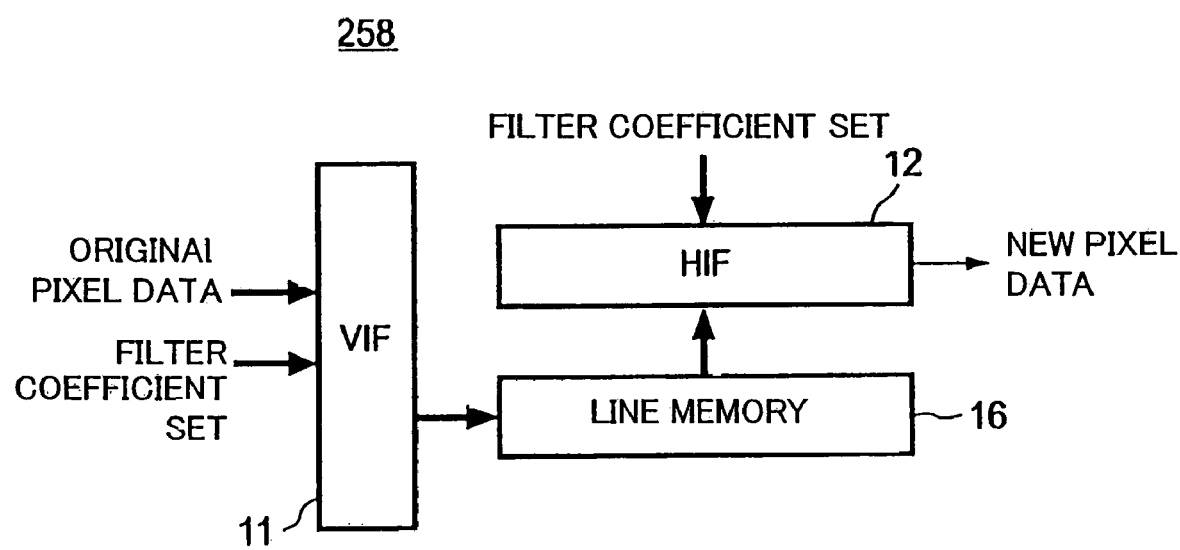
FIG. 22 is a block diagram of a filter unit in a third embodiment.

FIG. 22 is a block diagram of a filter unit having the configuration suitable for executing the interpolation method in the third embodiment.

The filter unit 258 illustrated in FIG. 22 has a vertical interpolation filter 11, a horizontal interpolation filter 12, and a line memory 16. The line memory 16 has a storage capacity able to store at least one line having the maximum resolution at one time. The line memory 16 is controlled by controlling for example a not illustrated drive circuit by the CPU 2a.

The deformation coordinates (Kx, Ky, Kz) due to the keystone distortion found by equations (3-1) to (3-3) shown in the first embodiment are for simultaneously finding the addresses of the interpolation points of the x-coordinates and the z-coordinates. Accordingly, this mode is not required for finding new pixel data with a high efficiency by the interpolation method of repeating the first interpolation operation in one direction of the vertical direction or the horizontal direction as in the interpolation method of the present embodiment and performing the second interpolation operation in the other direction of the vertical direction or the horizontal direction with respect to a plurality of interpolated data obtained as the result of this.

For this reason, below, the addresses of the distorted image shown in equation (3-1) and equation (3-3) are converted to the formats of addresses which can be independently interpolated in the vertical direction or the horizontal direction. That is, each of the keystone deformation addresses in the x-direction indicated by equation (3-1) and each of the keystone deformation addresses in the z-direction indicated by (3-3) is converted to two addresses, that is, an address of the interpolation position used in the vertical interpolation and an address of the interpolation position used in the horizontal interpolation. As a result, any address (x, z) of the keystone deformation coordinates is divided to the two sets of vertical direction elements (VX, VZ) and a horizontal direction elements (HX, HZ). However, the horizontal direction elements are at equal intervals at the time of vertical interpolation, while the vertical direction elements become equal in interval at the time of horizontal interpolation. Therefore, the equal interval elements can be used as they are. Accordingly, in practice, one set of addresses of a combination of (VX, HZ) or (HX, VZ) is calculated at a time. It is possible to calculate the addresses at the CPU 2a or calculate them by the CPU 2a in advance and store them in the ROM 255 or the like as a table.

First, the vertical direction interpolation will be explained as the first interpolation operation. In the present embodiment, the vertical direction interpolation operation is continuously carried out by exactly the required number of times corresponding to the number of pixels in the horizontal direction.

FIG. 23A shows the mapping image when projecting an image to the screen with an angle of 30 degrees from the left side and 10 degrees from the bottom when facing the screen. This mapping image is found in the same way as FIG. 14A found in the first embodiment. The following explanation will exemplify the case where the size and the position of the image after the interpolation are adjusted by changing the size and the position of the image to be interpolated with respect to the addresses of the keystone distortion given by equations (3-1) and equation (3-3).

FIG. 24 is a diagram showing an enlarged one part of FIG. 23B in which the address line AL1 found from Equation (3-1) and Equation (3-3) and the original image overlap.

The address line AL1 is the path of the positions at which a series of one line=s worth of original pixels in the horizontal direction is converted in address by keystone distortion in the same way as the cases of the first and second embodiments. In the case of the projection from the bottom left side when facing the screen, it forms a straight line inclined in the oblique direction. Each intersecting point between the oblique address line AL1 and the vertical lines connecting the original pixels in the vertical direction is indicated by a mark "x" in FIG. 24. These intersecting points, that is, the intersecting point PVa of the A column, the intersecting point PVb of the B column, the intersecting point PVc of the C column, the intersecting point PVd of the D column, the intersecting point PVe of the E column, the intersecting point PVf of the F column, the intersecting point PVg of the G column, the intersecting point PVh of the H column, . . . become the interpolation addresses at the time of the vertical direction interpolation operation as the first interpolation operation.

In the third embodiment, these interpolation addresses are calculated without using complex calculation equations such as equations (3-1) to (3-3).

First, in the present embodiment, in order to simply find the interpolation addresses, as shown in FIG. 23B, the range of the computation region in the horizontal direction is limited to the range where the addresses of the distorted image and the regular square image (original image) overlap. Further, in order to simplify the computation equation of the addresses, coordinate conversion becomes necessary.

Figure 25A:
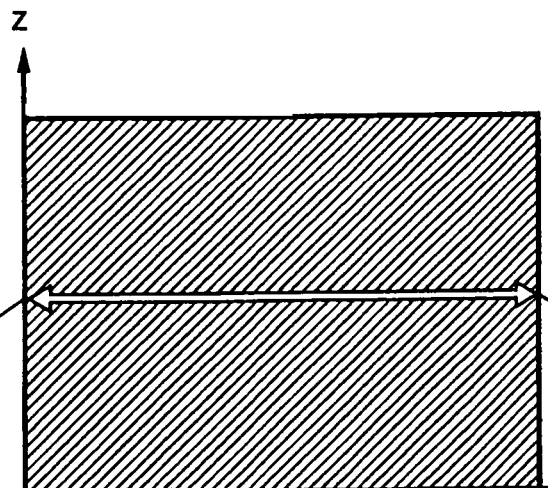
FIG. 25A is an explanatory view used for deriving vertical interpolation addresses (address coordinate system of the original image) taking note of one line.
Figure 25B:
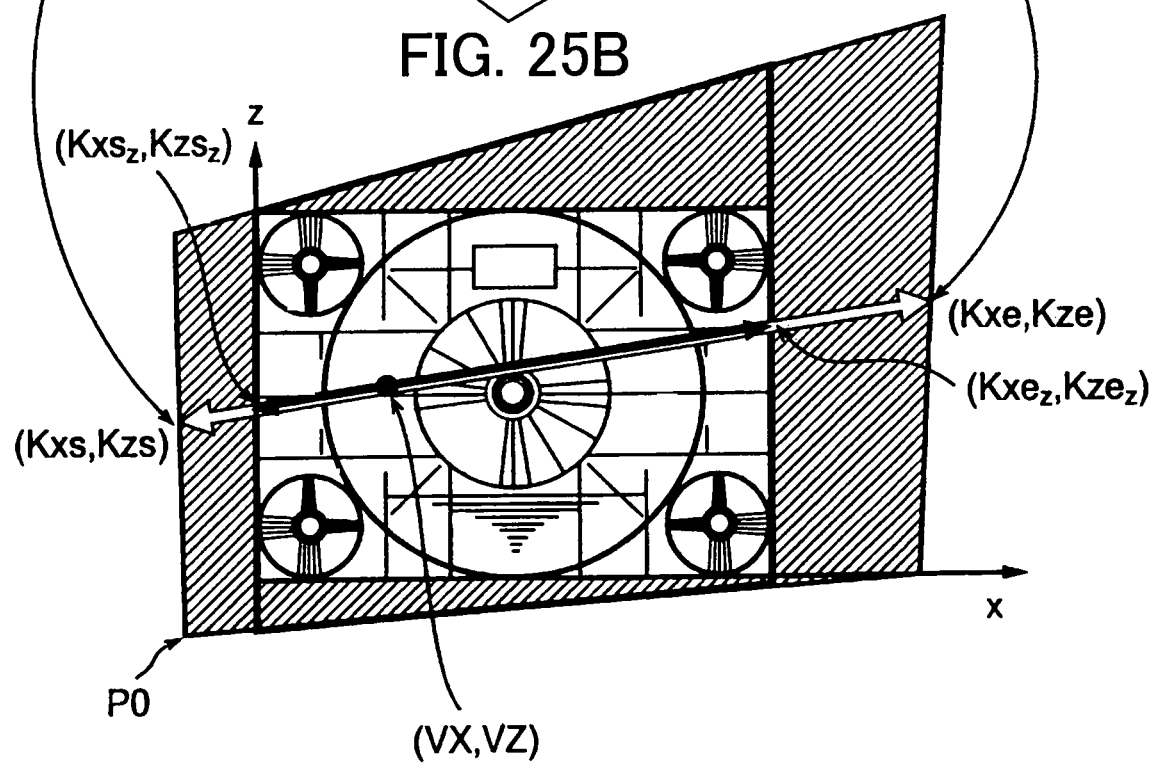
FIG. 25B is a view of the address coordinate system after the mapping.

FIG. 25A shows an address map of an original image before the keystone deformation and the xz coordinate axes at that time. FIG. 25B shows the address map after the keystone deformation, but the original xz coordinate axes have as the origin the left corner P0 of the keystone deformed image. That is, equation (3-1) and equation (3-3) are computation equations at coordinates using this P0 as the origin.

In the present embodiment, as shown in FIG. 25B, the xz coordinates are obtained using as the origin the left corner of the regular square original image overlapping the address map after the keystone deformation. In these xz coordinates, the z-coordinate of the address of any point is represented by the x-coordinate. This is because, the horizontal direction coordinate (x-coordinate) of an interpolation addresses used in vertical interpolation becomes a discrete value having units of a constant value for every pixel, so the computation equation is simplified by doing this.

In more detail, when expressing the coordinates of an address in vertical interpolation by (VX, VZ), in one line=s worth of interpolation operations, the x-coordinates VX of the interpolation addresses change in discrete values in units of constant values for every pixel in the horizontal direction. Further, the z-coordinates VZ at that time are on the oblique address line AL1 to which the interpolation pixels belong on the address map of the keystone deformation, therefore can be calculated by finding the inclination. The inclination of the address line AL1 becomes (KzeBKzs)/(KxeBKxs) using the address coordinates (Kxs, Kzs) at which the start point pixel of the line of the original image is located after the keystone deformation and the address coordinates (Kxe, Kze) at which the end point pixel is located after the keystone deformation as shown in FIG. 25A and FIG. 25B. When this inclination is used, the z-coordinates VZ of the interpolation addresses can be expressed as in equation (11).

$$VZ = Kzs + (VX - Kxs) \times \frac{(Kze - Kzs)}{(Kxe - Kxs)} \quad (11)$$

Accordingly, a vertical interpolation address (VX, VZ) of a pixel arranged at the position (x, z) after the interpolation in the xz coordinate system of FIG. 25B becomes as in equation (12). VX changes at equal intervals for every number of horizontal pixels of the input image (original image):

$$(VX, VZ) = (x, Kzs_z + (x - Kxs_z) \times \frac{(Kze_z - Kzs_z)}{(Kxe_z - Kxs_z)} \quad (12)$$

In equation (12), as shown in FIG. 25B, a keystone deformation address obtained by equations (3-1) and (3-3) with respect to the start point pixel at which the oblique address line intersects the z-axis is expressed by $(Kxs_z, Kzs_z)$, while a keystone deformation address obtained by equations (3-1) and (3-3) of the end point pixel at which the oblique address line intersects a line parallel to the z-axis corresponding to the right side of the region of FIG. 23B is expressed by $(Kxe_z, Kze_z)$.

Based on the vertical direction interpolation address indicated by equation (12), a plurality of original pixel data arranged in the vertical direction are selected for every column. In this selection, in the same way as the first embodiment, for example the CPU 2a selects two upper and lower pixel data each, i.e., four original image data in total, for every interpolation address. The selected basic pixel data are sequentially input to the vertical interpolation filter 11 of FIG. 22.

Due to this, the interpolated image as in FIG. 23C can be obtained. As an example, assumed vertical interpolation on the interpolation position PVf of FIG. 24. At this time, when the phase ratio between the interpolation position PVf and predetermined positions of the upper and lower pixels, for example, the pixel centers, is z1:z2, the value of the interpolated data Vf is computed as in equation (13).

$$Vf = F2 \times h\left(-1 - \frac{z1}{z1+z2}\right) + F3 \times h\left(-\frac{z1}{z1+z2}\right) + \\ F4 \times h\left(\frac{z2}{z1+z2}\right) + F5 \times h\left(1 + \frac{z2}{z1+z2}\right) \quad (13)$$

As shown in equation (13), one interpolated data Vf is generated by using two original pixel data F2 and F3 above the interpolation position and two original pixel data F4 and F5 below it. At the other interpolation positions PVa to PVe, PVh, . . . , the interpolated data is found by the same interpolation operation. As a result, the same number of the interpolated data as the horizontal resolution of the original image are output from the vertical interpolation filter 11 of FIG. 22 one after another and sequentially input to the line memory 16. The data held in the line memory 16 is used in the next horizontal interpolation processing (second interpolation operation). Note that depending on the processing, the storage capacity of the line memory 16 is not limited to the amount one line and may be a plurality of lines worth of capacity.

FIG. 26A shows the vertically interpolated image. Next, vertical interpolation processing is applied for the imageless regions at the right and left cut off when limiting the region in FIG. 23A to FIG. 23B. The compressed parts are added to the interpolation image of FIG. 26A. The images are combined in the line memory 16 resulting in the image of FIG. 26B.

Horizontal direction interpolation processing (second interpolation operation) is carried out on the image of FIG. 26B. Using the interpolation address at this time as (Iix, Hz), one image is interpolated. In this case, the vertical direction lines have already been interpolated, so to change the interpolation address Hz in the vertical direction for every vertical line, the coefficient of the z-coordinate thereof is made "1". Further, for the horizontal address lix, use is made of the initial address calculated in equation (3-1). Accordingly, the interpolation address (LIX, HZ) used in the horizontal direction interpolation of a pixel arranged at the position of (x, z) after the interpolation becomes as in equation (14).

$$(HX, HZ) = \left( \frac{(x \cdot Pz - z \cdot Px) \cdot \sin\alpha + (-X \cdot Py)\cos\alpha}{(x - Px) \cdot \sin(-\beta) + (-Py) \cdot \cos\alpha \cdot \cos(-\beta) - (z - Pz) \cdot \sin\alpha \cdot \cos(-\beta)}, z \right) \quad (14)$$

Here, the value of the horizontal element HX of an interpolation address is the x-coordinate Kx of the keystone deformation shown in equation (3-1) and designates the interpolation address in the x-direction used in the mapping as shown in FIG. 23A. The y-coordinate Sy of the projection surface in equation (3-1) of the x-coordinate Kx of the keystone deformation was denoted as zero since the screen is on the zx plane.

In this way, the horizontal direction interpolation address (HX, HZ) is found. The horizontal direction interpolation address (HX, HZ) is input to the horizontal direction interpolation filter 12 from the address generation unit or the ROM etc. The horizontal direction interpolation filter executes the horizontal direction interpolation operation at each point of the interpolation address in the corresponding address line by using the vertical direction interpolated data held in the line memory 16.

Figure 27A:
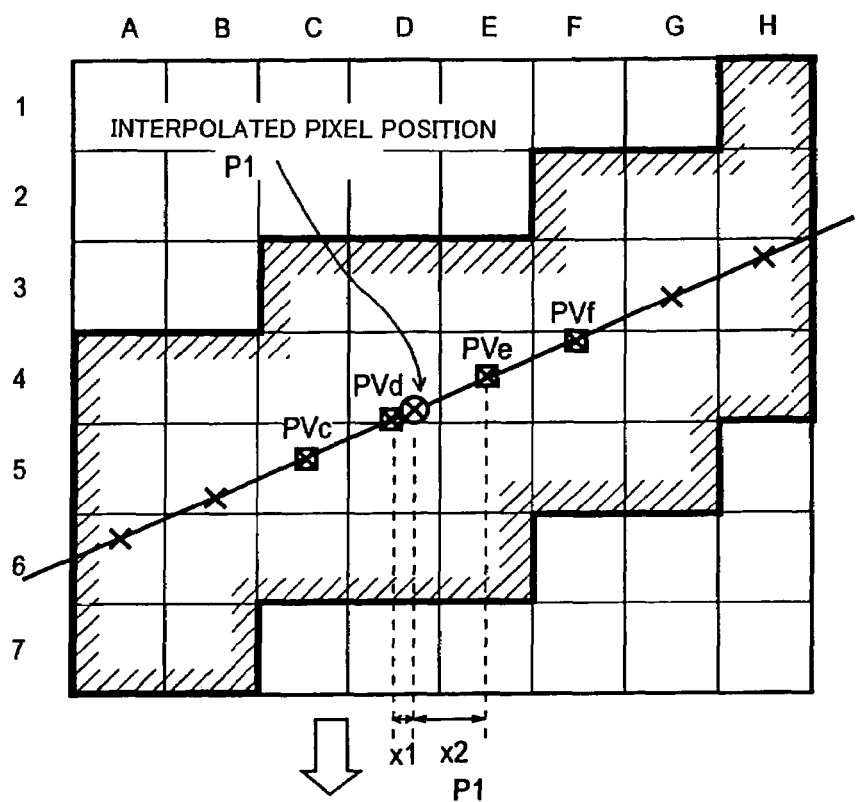
FIG. 27A and FIG. 27B are explanatory views of horizontal interpolation for generating one pixel data.
Figure 27B:
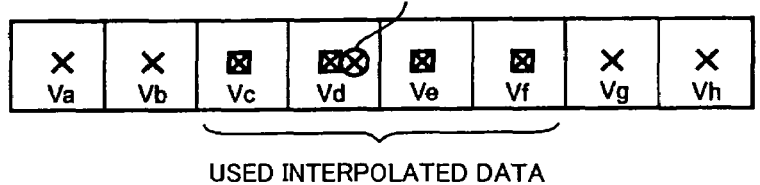
Figures 1, 28B:
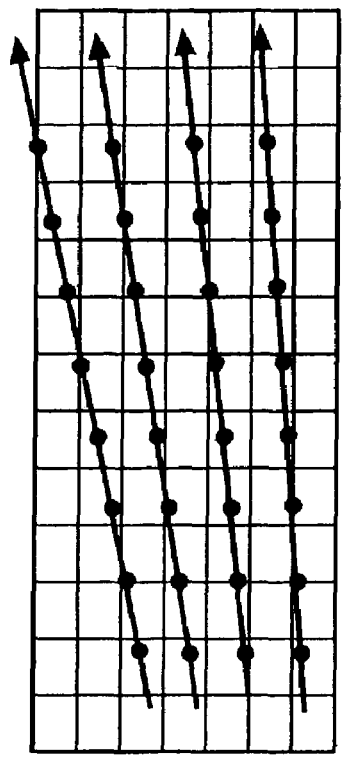
Figures 2, 28B:
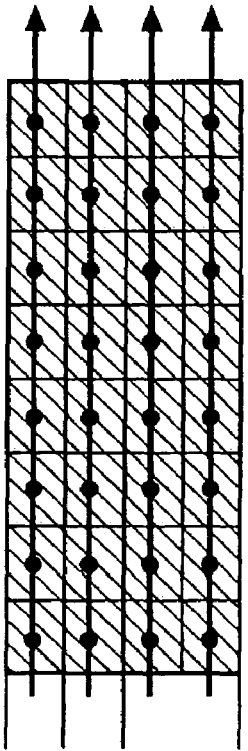
Figures 1, 28A:
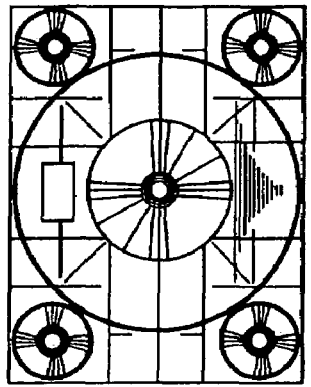
Figures 2, 28A:
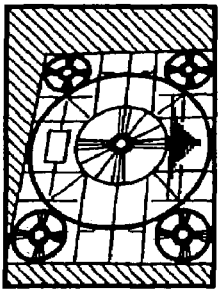
Figure 29:
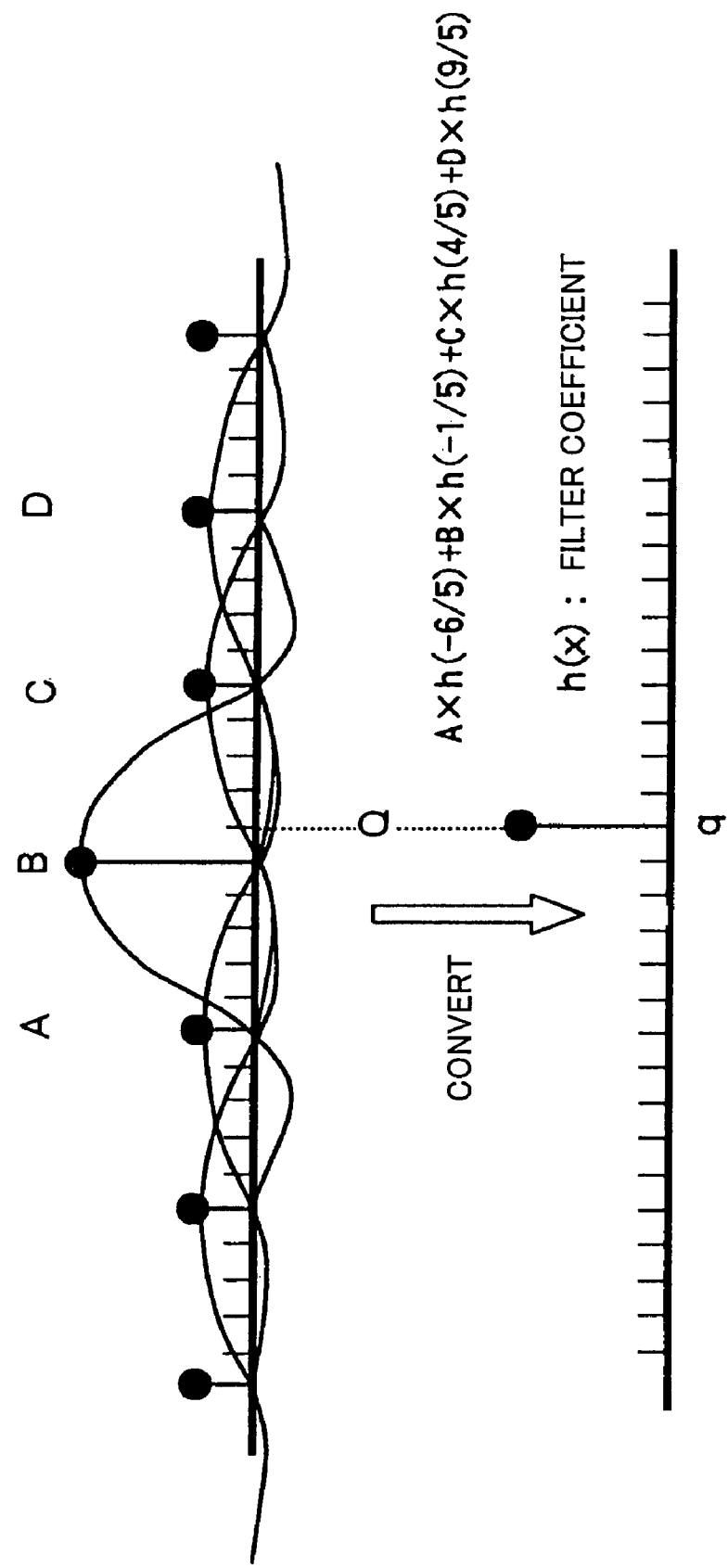
FIG. 29 is a view of an example of a one-dimensional interpolation operation for generating one pixel data by a convolution operation by a four-tap filter.
Figure 30:
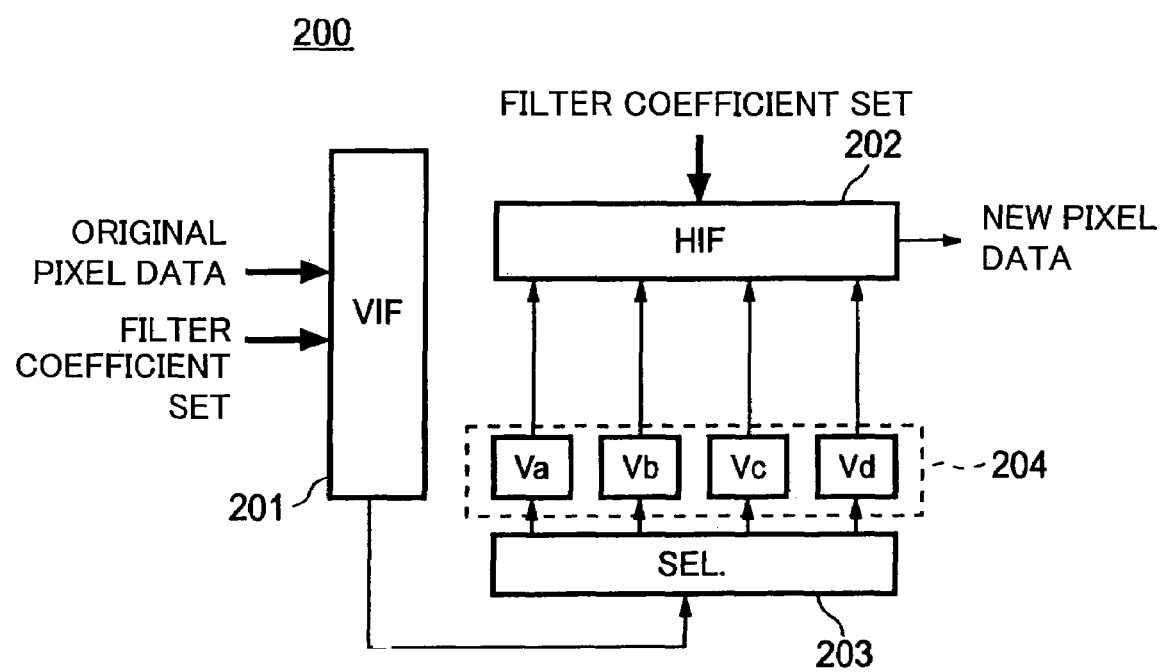
FIG. 30 is a block diagram of the general configuration of a filter unit for performing a one-dimensional filter operation independently two times.

FIG. 27A and FIG. 27B are explanatory views of the horizontal interpolation for generating a certain pixel data.

As shown in FIG. 27B, when generating the pixel data at for example the position P1, use is made of four interpolated data Vc, Vd, Ve, and Vf selected from the interpolated data having the smallest phase difference on the address line AL1 based on this horizontal direction interpolation position P1. When the phase difference between the horizontal direction interpolation position P1 and the position PVd of the interpolated data Vd at this time is x1 and the phase difference between the horizontal direction interpolation position P1 and the position PVe of the interpolated data Ve is x2, the second interpolation operation equation based on a convolution operation of these four pixel data become as shown in equation (15).

$$D1 = Vc \times h\left(-1 - \frac{x1}{x1 + x2}\right) + Vd \times h\left(\frac{x1}{x1 + x2}\right) + Ve \times h\left(\frac{x2}{x1 + x2}\right) + Vf \times h\left(1 + \frac{x2}{x1 + x2}\right) \quad (15)$$

The new pixel data D1 generated by this is generated, whereby the interpolation processing of one pixel is completed. By performing this interpolation processing in the horizontal direction with respect to all horizontal direction pixels while appropriately changing the interpolated data selected, one line's worth of the image subjected to keystone correction can be generated. Further, by performing the same processing on the other lines and performing all of the processing including the interpolation processing in the vertical direction and the horizontal direction in one frame, one frame of the corrected image is generated.

In the explanation of the third embodiment, the order of the interpolation operations was described as performing vertical interpolation as the first interpolation processing, then performing horizontal interpolation as the second interpolation processing, but it is also possible to perform horizontal interpolation as the first interpolation processing for exactly at least one line=s worth of the frame first, then perform the vertical interpolation as the second interpolation processing. Further, it is also possible to sequentially perform the first interpolation processing and the second interpolation processing in units of several lines or sequentially perform the first interpolation processing and the second interpolation processing in units of a frame.

In the above explanation, in the work of mapping the image with the addresses of the keystone distortion for the keystone correction, the position of the finally prepared keystone corrected image was adjusted by adjusting the size and the position of the image without changing the addresses. In the present embodiment, it is also possible to make adjustments by relatively changing the values of the addresses while fixing the size and the position of the image. In this case, the interpolation addresses found by equation (12) and equation (14) may be expressed by equations changing according to the change of the size and the position of the image.

In the third embodiment, after performing the first interpolation operation for at least one line=s worth of a frame, the second interpolation operation is repeated for at least the same number of times as the horizontal resolution. At this time, the coefficients of either the vertical direction or the horizontal direction coordinate parameters of the interpolation addresses used for the first interpolation operation are made "1", while the other of the vertical direction or the horizontal direction coordinate parameters of the interpolation addresses used for the second interpolation operation are made "1". By this, in the vertical direction interpolation operation, processing maintaining the intervals of the pixels in the horizontal direction as they are for the positions of the pixels after the mapping and interpolating in only the vertical direction in accordance with the mapping of the keystone distortion becomes possible. Conversely, in the horizontal direction interpolation operation, processing maintaining the intervals of the pixels in the vertical direction as they are for the positions of the pixels after the mapping and interpolating in only the horizontal direction in accordance with the mapping of the keystone distortion becomes possible.

As an effect common to the first to third embodiments, the range of selection of the original image data flexibly changes in accordance with the inclination of the address line, so the number of times of overlapping useless operations is reduced. For this reason, the processing efficiency of the frequently performed first interpolation operation can be improved.

Particularly, in the third embodiment, in addition to the reduction of the number of times of useless operations, as mentioned above, one set of addresses between each two sets of addresses originally generated for the vertical interpolation and for the horizontal interpolation is easily found by making the coefficients of the coordinate parameters "1". For this reason, substantially the generation of one set of the addresses is sufficient, and the efficiency of the address generation is improved. Further, the interpolation address element not having the coefficient of the coordinate parameter of "1" in an interpolation address used in the first interpolation operation performed previously is generated by a simple computation equation using the inclination of the address line. As a result, the efficiency of the first interpolation operation performed several times more frequently than the second interpolation operation can be further advanced.

The reduction of the number of computations of the first interpolation operation is directly linked with the improvement of the computation efficiency as a whole, so it becomes possible to effectively improve the efficiency of generation of an image for correcting the distortion.

From the above, the processing time can be reduced by the signal processing which becomes necessary when the projector projects an image from the oblique direction. Further, not by recomputing the overlapping vertical interpolated data, the pixel data fetched from the memory, which had been necessary overlappingly in the vertical operation unit, becomes unnecessary. For this reason, the load of the processing of the memory is reduced without greatly changing the interpolation technique and also the bit size of the memory may be made smaller.

Note that, in the above embodiments, the explanation was given taking as an example use of the LCD panel 3 as the display means, but the present invention is not limited to this and can be widely applied so far as the device is a fixed pixel device in which display pixels are arranged in a matrix such as a DMD (digital micromirror device).

Further, in the above embodiments, the explanation was given of an example wherein the projector 1 had the function of the image conversion processing for correcting the projection distortion, but the present invention is not limited to this and can be configured so as to correct the projection distortion by outputting an image converted signal from an apparatus performing this image conversion processing to the projector 1 too.

Further, in the above embodiments, the explanation was given of an example in which the projection surface was substantially vertically arranged, but the present invention is not limited to this. If the projection distortion is corrected based on the angle of the projection from the projector 1 with respect to the normal line of the projection surface, that is, the angle formed by the normal line of the projection surface and the optical axis of the optical unit 5, the projection surface may be arranged while being inclined with respect to the vertical line too. In this case, the coordinate conversion may be carried out for the arrangement of the screen 101 and the projector 1 by the inclination angle thereof.

As explained above, the image conversion apparatus of the first aspect of the present invention comprises an interpolating means for receiving as input the original image data, executing a first interpolation operation a plurality of times with respect to a plurality of original pixel data arranged in one of a vertical or horizontal direction in the original image, executing the second interpolation operation in the other direction, and generating new image data at the interpolation points and a storing means for storing the interpolated data obtained by the first interpolation operation, wherein, where a combination of the plurality of original pixel data is the same as a combination previously used when calculating interpolated data already stored in the storing means, the interpolating means reads out that interpolated data from the storing means and uses the same for the second interpolation operation.

Preferably, the image conversion apparatus is an image conversion apparatus which, when projecting an image onto a projection surface by utilizing light, converts an input original image to an image having distortion corrected in accordance with an angle of projection on the projection surface by interpolation processing, which image conversion apparatus comprises an address generating means for generating addresses of the image suffering from the distortion and a mapping means for linking positional information of the distortion-free original image with the addresses of the image suffering from distortion, wherein the interpolating means generates the new pixel data to be output to the display means based on the correspondences between the addresses and the positional information obtained from the mapping means by the execution of a plurality of first interpolation operations and a second interpolation operation.

The image conversion method of the first aspect of the present invention is for achieving the first object and comprises a first interpolation step of repeatedly executing a first interpolation operation for a plurality of original pixel data arranged in either of a vertical or horizontal direction of an input original image; a data storage step of temporarily storing a plurality of interpolated data generated by the first interpolation operations in a storing means; a second interpolation step of generating new pixel data by executing a second interpolation operation with respect to the plurality of interpolated data in the other direction different from the one direction; and a step of generating new pixel data by repeating the first interpolation step, the data storage step, and the second interpolation step, wherein, in the step of generating new pixel data, when a combination of a plurality of original pixel data is the same as a combination previously used when calculating the interpolated data and already stored in the storing means, that interpolated data is read out from the storing means and used for the second interpolation operation.

In the above image conversion apparatus, the address generating means generates the addresses of the distorted image, and the addresses of the distortion-free desired image are mapped on them. By this, the correspondences between the addresses of the interpolation points of the screen of the display means and the pixel positions of the original image corresponding to the addresses are determined. Accordingly, the pixel data of the original image used for generating the new pixel data at the interpolation points is also understood.

In the interpolation of the first aspect, the first interpolation operation is carried out on a plurality of original pixel data arranged vertically or horizontally, and the results thereof (interpolated data) are temporarily stored in the storing means. The second interpolation operation is executed in a different direction with respect to the plurality of interpolated data. As a result, a new pixel data is generated by the interpolating means and output. The interpolated data in the storing means is held delayed until at least the time when it can be utilized for the generation of other pixel data. After this, interpolated data having the same combination of the original image data as interpolated data already generated and held is not newly generated, but is read out from the storing means and utilized for the second interpolation operation.

The image projection apparatus of the second aspect of the present invention is an image projection apparatus having a display means having display pixels and a projecting means for projecting an image of the display means to a projection surface utilizing light from a light source and having a function of, when projecting an image, converting an input original image to an image having distortion corrected in accordance with the angle of projection on this projection surface by interpolation processing, comprising an address generating means for generating addresses of an image suffering from distortion; a mapping means for linking positional information of a distortion-free original image with the addresses of the image suffering from distortion; a selecting means for selecting a plurality of original image data for every intersecting point based on the intersecting points between an address line of the image suffering from distortion generated corresponding to the display pixels in the horizontal (vertical) direction and the plurality of lines connecting the original pixels in the vertical (horizontal) direction; and an interpolating means for executing a first interpolation operation at the intersecting points used as the reference at the time of the selection for each set of selected original pixel data, executing a second interpolation operation in a horizontal (vertical) direction with respect to the obtained plurality of interpolated data, and generating new pixel data to be output to the display means based on the correspondences between the addresses and the positional information obtained from the mapping means.

The image conversion method of the present invention is an image conversion method which, when projecting an image to a projection surface by utilizing light, converts an input original image to an image having distortion corrected in accordance with the angle of the projection on a projection surface by interpolation processing and outputs the same to a display means, comprising a step of generating addresses of an image suffering from distortion; a step of the mapping for linking positional information of a distortion-free original image with addresses of the image suffering from distortion; a step of selecting a plurality of original image data for every intersecting point based on the intersecting points between an address line on the image suffering from distortion corresponding to the display position of the display means in the horizontal (vertical) direction and a plurality of lines connecting the original pixels in the vertical (horizontal) direction; a step of executing a first interpolation operation at the intersecting points used as the reference at the time of selection for each set of the selected original image data; and a step of executing a second interpolation operation in the horizontal (vertical) direction with respect to a plurality of interpolated data obtained by the first interpolation operation and generating new pixel data to be output to the display means based on the correspondences of the addresses obtained by the mapping.

In the above invention, the addresses of the image suffering from distortion are generated, mapping is performed between these addresses and positional information of an original image, then a plurality of original pixel data arranged side in the vertical direction are selected to be used for a first interpolation operation. At this time, based on the intersecting points between an address line of the image suffering from distortion and a plurality of lines connecting the original pixels in the vertical direction, a plurality of original image data are selected for every intersecting point. Accordingly, when the address line is oblique, a set of a plurality of original pixel data shifted in the vertical direction in accordance with that can be selected. Even when the inclination of the address line is particularly large, original image data suitable for maintaining the precision of the interpolation operation is selected.

Next, a second interpolation operation is carried out on the plurality of interpolated data obtained by the first interpolation operation, whereby new pixel data is generated.

The image projection apparatus of the third aspect of the present invention is an image projection apparatus having a display means having display pixels and a projecting means for projecting an image of the display means to a projection surface by utilizing light from a light source and having a function of converting an input original image data to an image having distortion corrected in accordance with the angle of the on this projection surface when projecting by interpolation processing, comprising an address generating means for generating first interpolation addresses by a first relationship equation with a coefficient of a horizontal coordinate parameter in coordinates based on the pixel position of the original image set as "1" and generating second interpolation addresses by the second relationship equation with a coefficient of a vertical coordinate parameter set as "1"; a mapping means for linking positional information of a distortion-free original image with the addresses of the image suffering from distortion; and an interpolating means for finding the positions of the intersecting points between an address line of the image suffering from distortion generated corresponding to the display pixels in the horizontal (vertical) direction and a plurality of lines connecting the original pixels in the vertical (horizontal) direction by using the first interpolation addresses, executing the first interpolation operation at these intersecting points, executing the second interpolation operation at the interpolation points found by using the second interpolation addresses, and generating new pixel data to be displayed on the display means based on the correspondences of addresses obtained from the mapping means.

The image conversion method of the present invention has an address generation step of generating first interpolation addresses by a first relationship equation with a coefficient of a coordinate parameter of a first direction among horizontal and vertical directions set as "1" and generating second interpolation addresses by a second relationship equation with a coefficient of the coordinate parameter of the second direction different from the first direction set as "1"; a first interpolation step of selecting a plurality of original pixel data arranged in the second direction of the input original image by using the first interpolation addresses and repeatedly executing a first interpolation operation a plurality of times; and a second interpolation step of selecting a plurality of interpolated data arranged in the first direction generated by the first interpolation operation by using the second interpolation addresses and executing a second interpolation operation at the interpolation points to generate new pixel data.

In the third aspect, an addresses found by the computation at the time of the generation of addresses is only a combination of the other of the vertical and horizontal address of a first interpolation address in which the coefficient of the coordinate parameter is not "1" and one vertical or horizontal address of a second interpolation address. An address at which the coefficient of the coordinate parameter is 1 is not computed, or even when it is computed, almost no load is placed on the address generating means. By using this simple address, when the first interpolation operation is repeatedly executed and the second interpolation operation is executed for a plurality of interpolated data obtained as a result of this, a new pixel is generated in a short time.

According to the image conversion apparatus and image conversion method according to the present invention, the load of the address computation and the load of the interpolation operation increasing due to an increase of the address computation points or the complication of the computation equations are reduced and high speed processing becomes possible.

According to the image projection apparatus according to the present invention, the distortion of an image on a projection surface can be corrected at a high speed while effectively reducing the load on the means for performing the address computation and the interpolation operation and the load on the memory.

The invention claimed is:

1. An image conversion apparatus comprising:

an interpolating means for executing a first interpolation operation by a plurality of original pixel data arranged in one of a vertical or horizontal direction in an input original image, executing a second interpolation operation in the other direction different from said one direction using the plurality of interpolated data obtained by said first interpolation operation, and generating new image data at the interpolation points, and a storing means for storing said interpolated data obtained by said first interpolation operation, wherein, if a combination of said plurality of original pixel data is the same as a combination previously used when calculating said interpolated data already stored in said storing means, said interpolating means reads out that interpolated data from said storing means and uses the same for said second interpolation operation.

2. An image conversion apparatus as set forth in claim 1, wherein said interpolating means successively generates new image data of said interpolation points arranged on a line inclined in a horizontal direction or vertical direction with respect to said original pixels.

3. An image conversion apparatus as set forth in claim 1, further comprising a filter coefficient generating means for generating first filter coefficients to be used in said first interpolation operation with respect to said plurality of original pixel data arranged in one direction based on phases of points for finding said interpolated data with respect to positions of said pixels arranged in one direction.

4. An image conversion apparatus as set forth in claim 3, wherein said filter coefficient generating means generates second filter coefficients to be used in said second interpolation operation with respect to said plurality of interpolated data arranged in the other direction based on phases of said interpolation points with respect to positions for finding said interpolated data arranged in the other direction.

5. An image conversion apparatus as set forth in claim 2, wherein:

said storing means comprises a memory for storing at least one line's worth of said plurality of interpolated data to be used for interpolation of said interpolation points arranged in said inclined line, and said interpolating means repeatedly executes said first interpolation operation for each line and repeatedly executes said second interpolation operation while changing the combination of interpolated data selected from said one line's worth of interpolated data obtained.

6. An image conversion apparatus as set forth in claim 5, wherein said interpolating means executes said first interpolation operations for individual lines together for one image and executes said second interpolation operation using said one image's worth of interpolated data obtained together for one image.

7. An image conversion apparatus as set forth in claim 1, wherein said image conversion apparatus comprises an image conversion apparatus which, when projecting an image onto a projection surface by utilizing light, converts said original image to an image having distortion corrected in accordance with an angle of said projection with respect to a normal line of said projection surface by interpolation processing and outputs the result to a display means, which image conversion apparatus comprises:

an address generating means for generating addresses of the image suffering from said distortion corresponding to display positions of said display means and a mapping means for linking positional information of the distortion-free original image with said addresses of the image suffering from distortion, wherein said interpolating means generates the new pixel data to be output to said display means based on the correspondences between said addresses and said positional information obtained from said mapping means by the execution of a plurality of said first interpolation operations using said storing means and said second interpolation operation.

8. An image conversion apparatus as set forth in claim 7, wherein said addresses are generated by said address generating means corresponding to matrix-like display pixels arranged in orthogonally intersecting first and second directions of said display means, and said positional information of the original image is set corresponding to said first and second direction pixels of said original image.

9. An image conversion apparatus as set forth in claim 8, further comprising a selecting means for selecting a plurality of original image data for each intersecting point and outputting them to said interpolating means based on intersecting points between an address line of an image suffering from distortion generated by said address generating means corresponding to said display pixels arranged in said one direction and a plurality of lines connecting said pixels in said second direction.

10. An image conversion apparatus as set forth in claim 8, wherein said interpolating means executes said first interpolation operation at each intersecting point between an address line of an image suffering from distortion generated by said address generating means corresponding to said display pixels arranged in said one direction and a plurality of lines connecting said pixels in said second direction and executing said second interpolation operation on said obtained plurality of interpolated data.

11. An image conversion apparatus as set forth in claim 10, wherein said interpolating means repeatedly executes said first interpolation operation for each address line of said image suffering from distortion and repeatedly executes said second interpolation operation while changing the combination of interpolated data selected from said one line's worth of interpolated data obtained.

12. An image conversion apparatus as set forth in claim 11, wherein said interpolating means executes said first interpolation operations for individual lines together for one image and executes said second interpolation operation using said one image's worth of interpolated data obtained together for one image.

13. An image conversion apparatus as set forth in claim 11, wherein said address generating means finds first interpolation addresses by a first relationship equation with a coefficient of a coordinate parameter of said first direction in coordinates based on the pixel position of the original image set as "1" and finds second interpolation addresses by a second relationship equation with a coefficient of a coordinate parameter of said second direction set as "1" so as to generate addresses of an image suffering from distortion.

14. An image conversion apparatus as set forth in claim 13, wherein said first interpolation addresses are found by said first relationship equation having as a variable only the coordinate parameter of said first direction changing at equal intervals.

15. An image projection apparatus having a display means having display pixels arranged in a matrix in first and second directions intersecting each other orthogonally and a projecting means for projecting an image displayed at the display means to a projection surface utilizing light from a light source and having a function of, when projecting an image to said projection surface, converting an input original image to an image having distortion corrected in accordance with the angle of said projection to a normal line of said projection surface by interpolation processing, comprising
    an address generating means for generating addresses of an image suffering from distortion corresponding to positions displayed on said display means;
    a mapping means for linking positional information of a distortion-free original image with said addresses of the image suffering from distortion;
    a selecting means for selecting a plurality of original image data of said second direction for every intersecting point based on the intersecting points between an address line of said image suffering from distortion generated by said address generating means corresponding to said display pixels arranged in said first direction and the plurality of lines connecting said pixels in said second direction; and
    an interpolating means for executing a first interpolation operation at said intersecting points used as the reference at the time of the selection for each set of selected original pixel data, executing a second interpolation operation in said first direction with respect to the obtained plurality of interpolated data, and generating new pixel data to be output to the display means based on the correspondences between the addresses and said positional information obtained from said mapping means.

16. An image projection apparatus having a display means having display pixels arranged in a matrix in first and second directions intersecting each other orthogonally and a projecting means for projecting an image displayed at the display means to a projection surface utilizing light from a light source and having a function of, when projecting an image to said projection surface, converting an input original image to an image having distortion corrected in accordance with the angle of said projection to a normal line of said projection surface by interpolation processing, comprising
    an address generating means for finding first interpolation addresses by a first relationship equation with a coefficient of a coordinate parameter of said first direction in coordinates based on the pixel position of the original image set as "1" and finding second interpolation addresses by a second relationship equation with a coefficient of a coordinate parameter of said second direction set as "1";
    a mapping means for linking positional information of a distortion-free original image with said addresses of the image suffering from distortion; and
    an interpolating means for finding the positions of the intersecting points between an address line of said image suffering from distortion generated by said address generating means corresponding to the display pixels of said first direction and a plurality of lines connecting the original pixels in said second direction by using said first interpolation addresses, executing the first interpolation operation at these intersecting points, executing the second interpolation operation at the interpolation points found by using the second interpolation addresses for the obtained interpolated data, and generating new pixel data to be displayed on the display means based on the correspondences of addresses obtained from the mapping means.

17. An image conversion method comprising:
    a first interpolation step of repeatedly executing a first interpolation operation for a plurality of original pixel data arranged in either of a vertical or horizontal direction of an input original image;
    a data storage step of temporarily storing a plurality of interpolated data generated by the first interpolation operations in a storing means;
    a second interpolation step of generating new pixel data by executing a second interpolation operation with respect to the plurality of interpolated data in the other direction different from said one direction; and
    a step of generating new pixel data by repeating the first interpolation step, the data storage step, and the second interpolation step, wherein,
    in the step of generating new pixel data, if a combination of a plurality of original pixel data is the same as a combination previously used when calculating the interpolated data and already stored in the storing means, that interpolated data is read out from the storing means and used for the second interpolation operation.

18. An image conversion method which, when projecting an image to a projection surface by utilizing light, converts an input original image to an image having distortion corrected in accordance with the angle of said projection on a projection surface by interpolation processing and outputs the same to a display means, comprising:
    a step of generating addresses of an image suffering from distortion;
    a step of mapping for linking positional information of a distortion-free original image with addresses of the image suffering from distortion;
    a step of selecting a plurality of original image data for every intersecting point based on the intersecting points between an address line of an image suffering from distortion generated by said address generating means corresponding to display positions of said display means in a first direction among horizontal and vertical directions and a plurality of lines connecting the original pixels in a second direction different from said first direction;
    a step of executing a first interpolation operation at said intersecting points used as the reference at the time of selection for each set of the selected original image data; and
    a step of executing a second interpolation operation in the horizontal direction with respect to a plurality of interpolated data obtained by the first interpolation operation and generating new pixel data to be output to the display means based on the correspondences of the addresses obtained by the mapping.

19. An image conversion method including:
    an address generation step of generating first interpolation addresses by a first relationship equation with a coefficient of a coordinate parameter of a first direction among horizontal and vertical directions set as "1" and generating second interpolation addresses by a second relationship equation with a coefficient of the coordinate parameter of the second direction different from said first direction set as "1";

a first interpolation step of selecting a plurality of original pixel data arranged in said second direction of the input original image by using said first interpolation addresses and repeatedly executing a first interpolation operation a plurality of times; and a second interpolation step of selecting a plurality of interpolated data arranged in said first direction generated by said first interpolation operation by using said second interpolation addresses and executing a second interpolation operation at the interpolation points to generate new pixel data.

* * * * *